Aug. 31, 1965  E. P. BULLARD III  3,203,276
VARIABLE SPEED TRANSMISSION
Filed Feb. 23, 1961  12 Sheets-Sheet 1

*INVENTOR.*
EDWARD P. BULLARD III

ATTORNEY

*INVENTOR.*
EDWARD P. BULLARD III

ATTORNEY

Aug. 31, 1965  E. P. BULLARD III  3,203,276
VARIABLE SPEED TRANSMISSION
Filed Feb. 23, 1961  12 Sheets-Sheet 3

*INVENTOR.*
EDWARD P. BULLARD III

BY

ATTORNEY

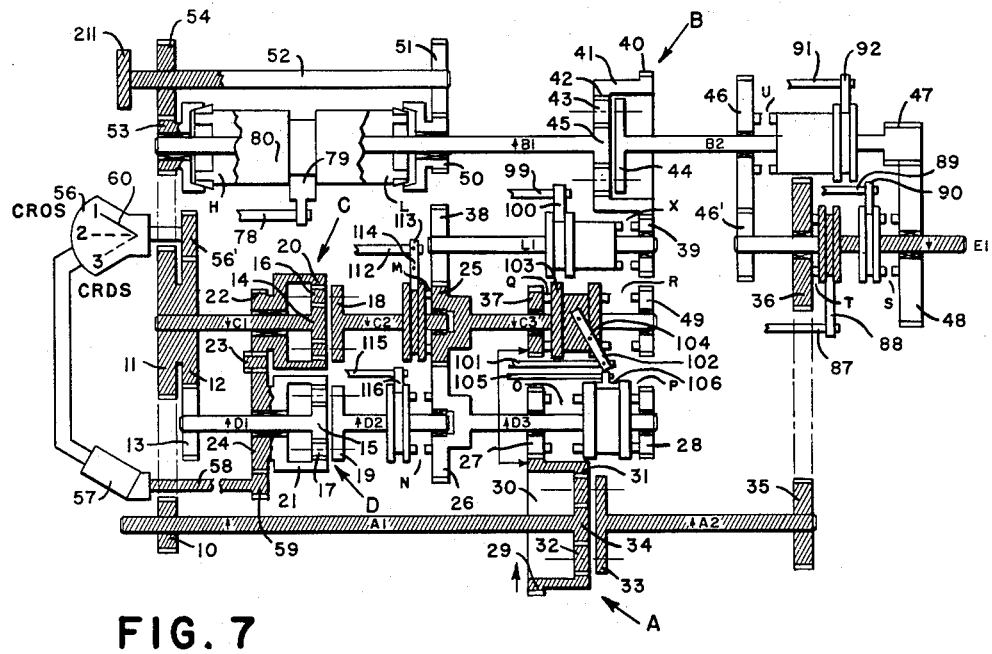

*INVENTOR.*
EDWARD P. BULLARD III

ATTORNEY

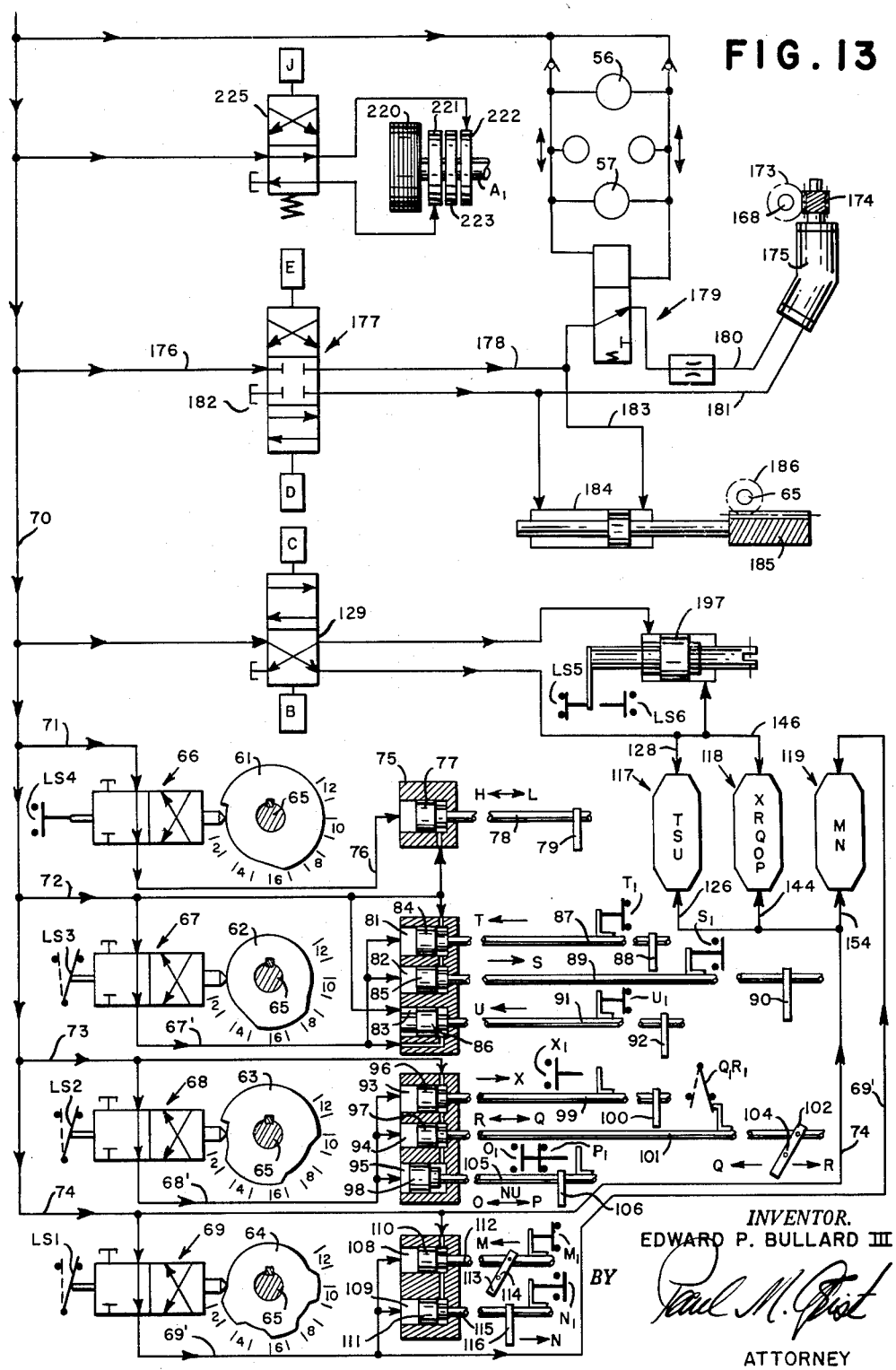

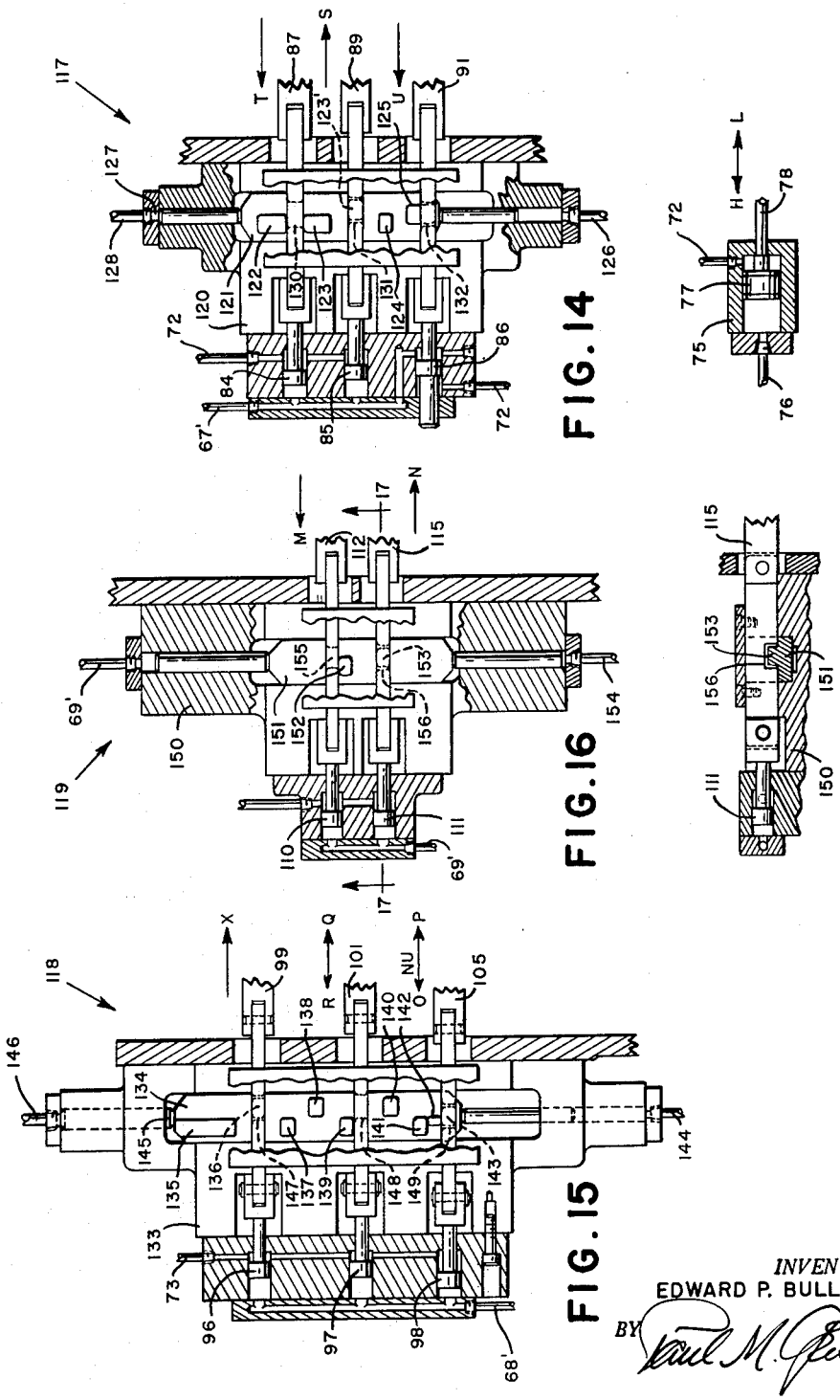

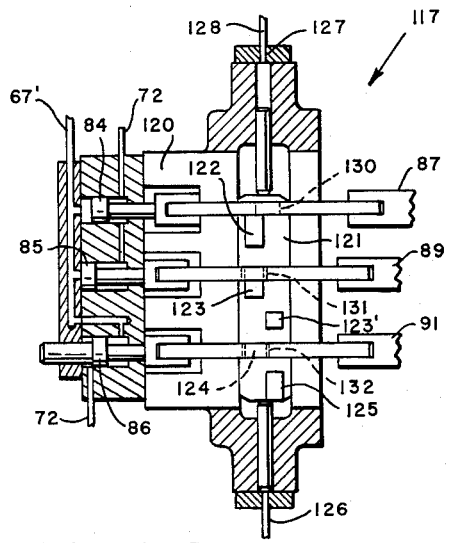
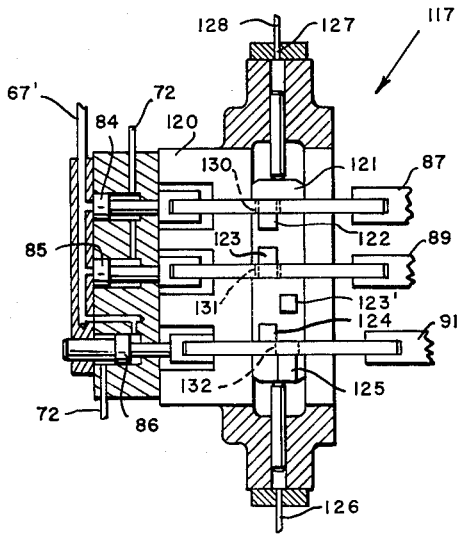
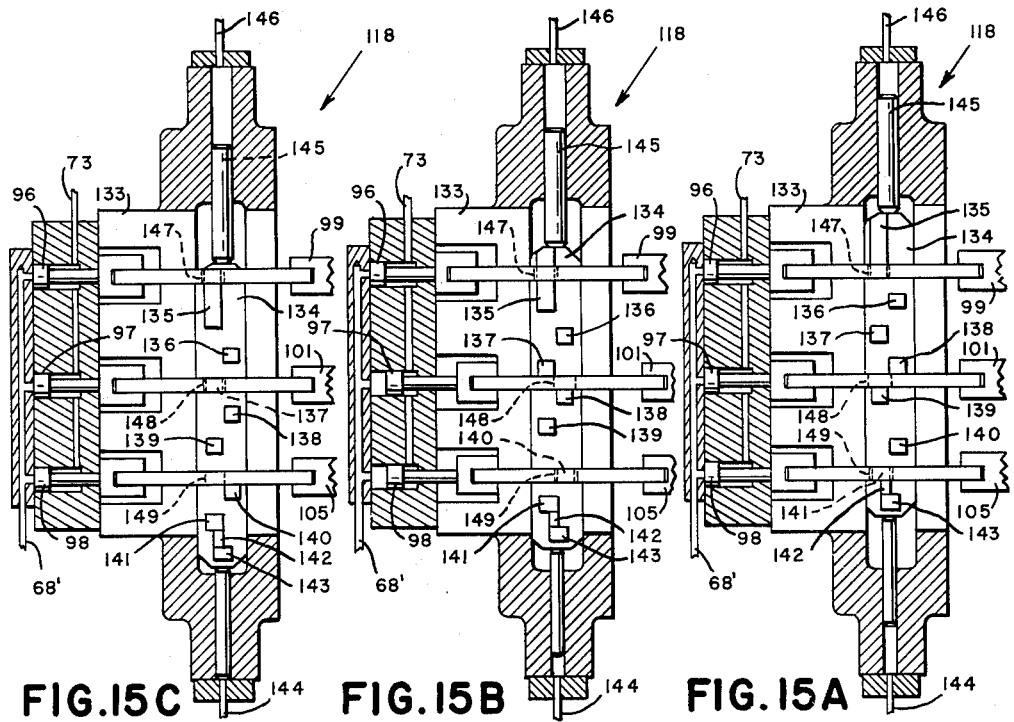

Aug. 31, 1965  E. P. BULLARD III  3,203,276
VARIABLE SPEED TRANSMISSION
Filed Feb. 23, 1961  12 Sheets-Sheet 10

INVENTOR.
EDWARD P. BULLARD III
BY
ATTORNEY

Aug. 31, 1965     E. P. BULLARD III     3,203,276
VARIABLE SPEED TRANSMISSION
Filed Feb. 23, 1961     12 Sheets-Sheet 11

INVENTOR.
EDWARD P. BULLARD III
BY
ATTORNEY

Aug. 31, 1965　　　　E. P. BULLARD III　　　　3,203,276
VARIABLE SPEED TRANSMISSION
Filed Feb. 23, 1961　　　　　　　　　　　　　　12 Sheets-Sheet 12
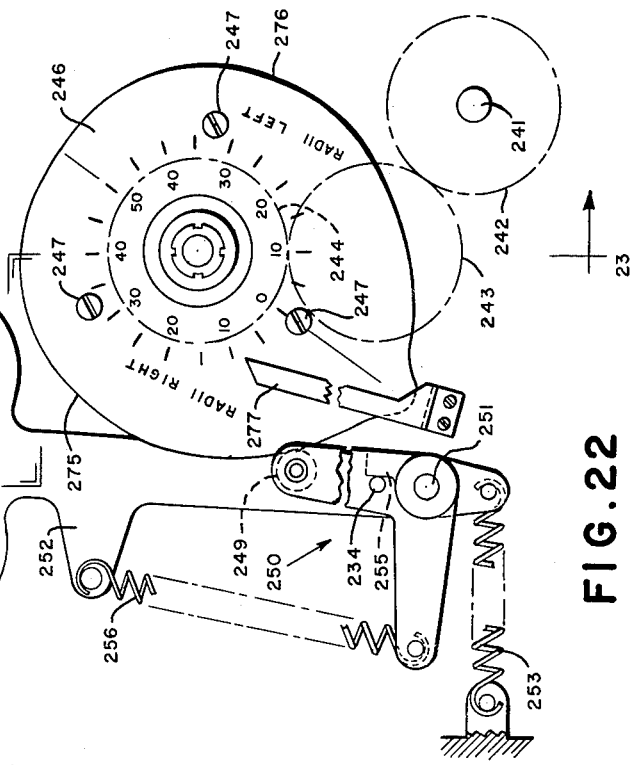
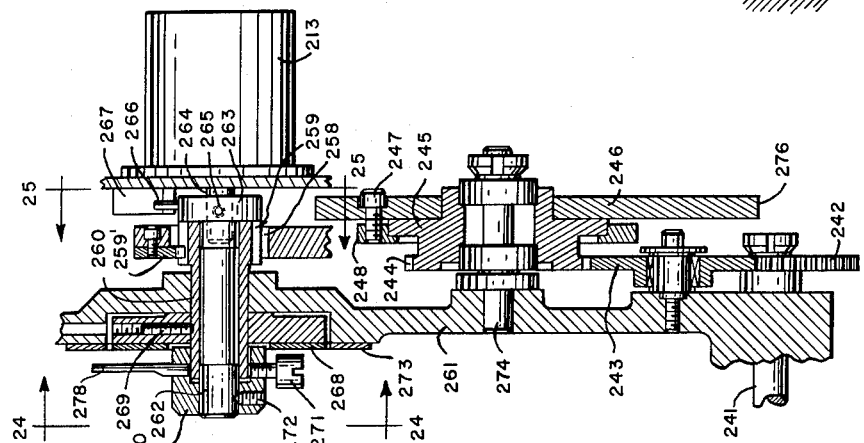
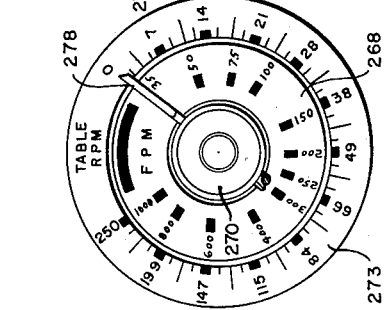
*INVENTOR.*
EDWARD P. BULLARD III
BY
ATTORNEY 3,203,276
Patented Aug. 31, 1965

1

3,203,276
VARIABLE SPEED TRANSMISSION
Edward P. Bullard III, Cherry Lane, Fairfield, Conn.
Filed Feb. 23, 1961, Ser. No. 91,207
33 Claims. (Cl. 74—687)

The present invention relates to transmissions, and particularly to a new and improved steplessly variable speed transmission capable of developing a relatively high torque at relatively low speeds.

This invention is related to the invention shown, described and claimed in U.S. Patent No. 2,972,905, granted February 28, 1961, to E. P. Bullard III.

Conventional variable speed transmissions having a plurality of trains of gears that are rendered effective by shifting clutches are capable of producing high torque at low speeds because as the effective gear ratio is varied to produce low speeds, the torque capabilities rise correspondingly. However, such transmissions are not steplessly variable and, therefore, are not suitable for many industrial installations.

The presently available steplessly variable speed transmissions that are capable of producing speeds from zero all have constant torque characteristics which, when the developed horsepower is plotted against speed, produce a straight line graph from zero and having a predetermined slope. Such a transmission having a relatively slight slope can produce only low torque at low speed, and any substantial increase in torque can only be developed at a substantial increase in speed.

The cost to manufacture known steplessly variable speed transmissions having a substantially steep torque curve becomes increasingly great so that they have been limited economically to those having a relatively low torque at low speeds.

The principal object of this invention is to provide a steplessly variable speed transmission of economical construction and possessing relatively steep torque curve characteristics so that substantially high torque can be produced at relatively low speeds.

Another object of this invention is to provide a steplessly variable speed transmission having any desired speed range of substantially constant horsepower at any desired value.

Another object of the invention is to provide such a transmission in which the steplessly variable speed is effected with intermeshing gear trains and positive tooth-engaging clutches.

Still another object of the invention is to provide such a transmission in which a steplessly variable auxiliary speed transmission is combined with positive meshing, synchronous, clutch shifting transmission mechanism.

Still another object of the invention is to provide such a transmission in which the power that flows through the auxiliary transmission is only a small fraction of the total passing through the combined transmission.

Still another object of the invention is to provide a control for said transmission that is interlocked in a manner to prevent improper shifting of clutches within the transmission.

In one aspect of the invention, the transmission may comprise plural paths of power flow, each having an epicyclic gearing train therein. An epicyclic gearing train usually comprises at least a sun gear, a reaction gear and an arm supporting planet gears that mesh with the sun and reaction gears. Holding the reaction gear against rotation and rotating the sun gear causes the arm to rotate at "base speed" which depends upon the specific ratio of the gears forming the train and upon the speed of the sun gear. Rotating the reaction gear in the direction of the sun gear increases the arm speed above the

2

"base speed"; and, rotating the reaction gear oppositely to the sun gear decreases the arm speed below the "base speed."

In another aspect of the invention, the plural paths of power flow may be two, each leading to a single output shaft through suitable positive tooth-engaging clutches. The epicyclic gearing arrangement in each path may be effective alone for transmitting power to the output shaft through separate basic ranges of speed. In order to have the first basic range of speeds start at zero, the reaction gear of the epicyclic gearing in one of the paths is initially rotated in a direction opposite to its sun and at a speed such that its arm is stationary so that the speed of the output shaft is zero. The speed of this reactor gear may be reduced in a stepless manner to zero and then increased in speed in the opposite direction to a predetermined value to thereby produce one of the basic ranges of speed.

The gearing leading to the reaction gear of the epicyclic gearing in the second path is such that when the reaction gear of the epicyclic gearing in the first path is at its top speed in the direction of its sun, the reaction gear of the second is rotating in a direction opposite to its sun and at a speed which, through suitable gearing, is rotating a clutch on the common output shaft at a speed that is synchronous with that of the clutch that drives the output shaft from the epicyclic gearing in the first path. Accordingly, the clutches on the output shaft may be shifted so that the epicyclic gearing of the second path alone drives the output shaft. Then, by decreasing the speed of the reaction gear of the epicyclic gearing in the second path to zero and reversing its rotation and increasing its speed in the direction of rotation of its sun to a predetermined value, a second basic range of speeds of the output shaft is produced that continues uninterruptedly from the first basic range.

At this point, the reaction gear of the epicyclic gearing in the first path is now rotating opposite to its sun at a maximum speed. By changing the speed of rotation of its sun to a value causing the first clutch on the output shaft to rotate at a synchronous speed with that of the second, these clutches can again be shifted so that the first epicyclic gearing now drives the output shaft alone. Then, by decreasing the speed of the reaction gear of the epicyclic gearing in the first path to zero, reversing it and increasing it to its maximum value, a third basic range of speeds is produced that continues uninterruptedly from the top of the second basic range.

Each of the three basic ranges of speed may be composed of four sub-ranges, two of which may be produced by another pair of epicyclic gearing arrangements and two of which may be produced by interposing reversing gearing between the first and second pairs of epicyclic gearing.

The second pair of epicyclic gearing arrangements may be operated as follows, only one at a time being effective as before. The reaction gear of one of the second pair of epicyclic gearing arrangements may be rotated at a speed, and in the direction of its sun, such that its output shaft rotates the reaction gear of the previously described epicyclic gearing in the first path of power flow in a direction opposite to its sun and at a speed such that its output is zero. The speed of the effective reaction gear of the second pair of epicyclics is reduced to zero and increased in the opposite direction to its sun to a maximum speed. At this point the reaction gear of the other of the second pair of epicyclics is rotating at a maximum speed in the direction of its sun. Then, by rendering it effective by suitable clutches, decreasing the speed of this last reaction gear to zero and increasing it to maximum in the direction opposite to its sun causes its output and the effective reactor of the epicyclic within the first path of power flow to reduce in speed to zero so that the output therefrom, and the output shaft itself, have increased in speed from zero to "base speed" of the effective epicyclic gearing of the first pair. Since this latter reactor is now at zero speed, the reversing clutch can be shifted. Accordingly, since the reactor of the effective epicyclic of the second pair is now rotating at top speed in a direction opposite to its sun, decreasing its speed increases the output speed from its epicyclic from zero. Therefore, by retracing the steps of operation of the second pair of epicyclics, the speed of the effective reactor of the first pair of epicyclics increases to top speed in the direction of its sun, thereby increasing its output speed accordingly.

This action of the second pair of epicyclic gearing arrangements may be employed in the same manner with the other epicyclic gearing arrangement in the second path of power flow, as well as again with the first when its sun is rotated at a different rate of speed. From the foregoing, it is evident that twelve sub-ranges of speed can be produced in which each succeeding sub-range is a continuation from the top of the next preceding sub-range.

In another aspect of the invention, as the various clutches approach synchronous speed prior to shifting, they may be prevented from attaining exactly synchronous speed, so that in shifting clutches the teeth thereof will not land tooth-on-tooth.

In still another aspect of the invention, a control may be provided for actuating the steplessly variable device that is employed to rotate the reaction gears of the second pair of epicyclic gearing arrangements, and in the embodiment disclosed, this device may comprise a variable and constant displacement hydraulic unit within a closed circuit.

In still another aspect of the invention, hydraulic, positive acting, interlocking shuttles may be employed between the various clutches to insure their proper operation, and particularly the engagement of a clutch to carry the load prior to the disengagement of a clutch that is carrying the load.

In still another aspect of the invention, a servo system may be employed to automatically control the operation of the transmission, when it is employed to rotate a work supporting table of a lathe, to produce a constant cutting speed as a tool is moved radially across a piece of work on the table.

The above, other objects and novel features of the invention will become apparent from the following specification and accompanying drawings which are merely exemplary.

In the drawings:

FIGS. 1 to 12, inclusive, are schematic stretchout views of a transmission to which the principles of the invention have been applied, showing in section the flow of power therethrough for each of the twelve stages of the transmission;

FIG. 13 is a schematic hydraulic circuit diagram;

FIGS. 14, 14a, 14b, 15, 15a, 15b, 15c and 16 are sectional views of the interlocking mechanism in various positions;

FIG. 17 is a sectional view taken substantially along line 17—17 of FIG. 16;

FIG. 18 is a detail of a clutch shifting piston and cylinder;

FIG. 22 is a view of a constant cutting speed control for the boring mill shown in FIG. 21;

FIG. 23 is a sectional view taken substantially along line 23—23 of FIG. 22; and FIGS. 24 and 25 are views of details of the control shown in FIGS. 22 and 23.

Figure 1:
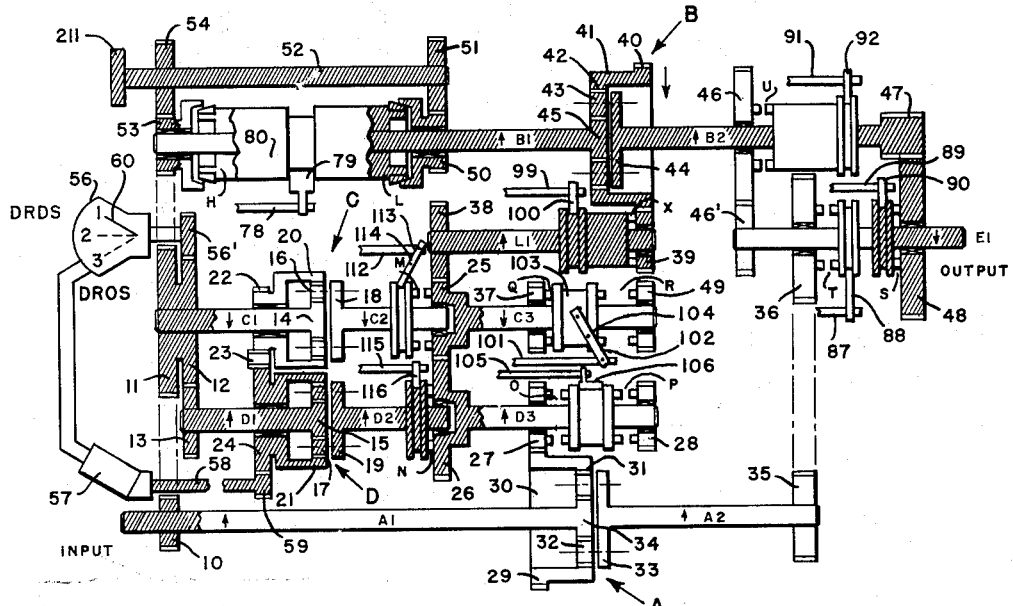

Referring to FIG. 1, the principles of the invention are shown as applied to a transmission, herein disclosed in a stretchout schematic form in which certain intermeshing gears are shown separated for clarity. Since a critical feature of this invention deals with the provision of a transmission having any desired predetermined range of speeds at substantially constant horsepower, the description will include a given set of values of gear ratios in order to clearly point out the theory of operation of the invention. It is, of course, understood that other ratios may be employed so long as they are applied in the same manner as those applied herein.

An input shaft A1 has fixed to it a pinion 10 having 21 teeth that mesh with a gear 11 having 63 teeth, which latter is fixed to a shaft C1, parallel to shaft A1. A gear 12 having 72 teeth integral with gear 11 meshes with a gear 13 having 40 teeth and which gear 13 is fixed to a shaft D1 also parallel to shaft A1. Sun gears 14 and 15, each having 40 teeth are fixed, respectively, to shafts C1 and D1 and they mesh with planet gears 16 and 17 each having 16 teeth. The planet gears 16 and 17 are journaled on pins supported by arms 18 and 19. Internal gears of reactors 20 and 21 each having 72 teeth, respectively, mesh with the planet gears 16 and 17, and reactor 20 is provided with an external gear 22 having 69 teeth which is in mesh with an idle gear 23 between it and an external gear 24 having 115 teeth that is fixed to the reactor 21.

The arms 18 and 19, respectively, are integrally connected to shafts C2 and D2 that are coaxial with shafts C1 and D1, respectively, thereby completing the two planetary differentials which will be referred to hereinafter as the C and D planetaries. Slidable clutches M and N on shafts C2 and D2 are adapted, respectively, to connect and disconnect shafts C2 and D2 to shafts C3 and D3 through intermeshing gears 25 and 26 having 21 and 35 teeth, respectively. The shaft D3 is adapted to journal gears 27 and 28, each having 28 teeth, and between which integrally united clutchs O and P are splined to shaft D3.

The gear 27 meshes with an external gear 29 having 56 teeth on a reactor 30, also referred to as AR, journaled on shaft A1. The reactor 30 includes an internal gear 31 having 60 teeth which meshes with planet gears 32 having 20 teeth journaled on pins fixed to an arm 33. A sun gear 34 having 20 teeth fixed to shaft A1 meshes with planet gears 32 to complete the planetary differential on shaft A1 which will be referred to as the A planetary.

The shaft A2 to which arm 33 is fixed has rigidly attached to it a gear 35 having 24 teeth which meshes with a gear 36 having 36 teeth. The gear 36 is journaled on an output shaft E1, and a clutch T splined to shaft E1 is adapted to connect and disconnect gear 36 to shaft E1.

The shaft C3 has a gear 37 with 28 teeth journaled on it. This gear 37 meshes with the external gear 29 of the reactor 30. A clutch Q splined to shaft C3 is adapted to connect and disconnect gear 37 to shaft C3. The gear 25 meshes with a gear 38 having 21 teeth that is fixed to a shaft L1 parallel to shaft C3. Shaft L1 also journals a gear 39 having 28 teeth that meshes with an external gear 40 having 56 teeth of a reactor 41. A clutch X is splined to shaft L1 and it is adapted to connect and disconnect gear 39 to it. The reactor 41 also includes an internal gear 42 having 60 teeth that meshes with planet gears 43 having 20 teeth, which latter are journaled on pins connected to an arm 44. A sun gear 45 having 20 teeth also meshes with the planet gears 43 and it is fixed to a shaft B1 that likewise is parallel to shaft L1. The arm 44 is integral with a shaft B2 axially aligned with shaft B1, thereby completing the planetary differential on shaft B1 which will be referred to as the B planetary. Shaft B2 journals a gear 46 having 38 teeth adapted to be connected to, and disconnected from, shaft B2 by a clutch U that is splined to shaft B2. The gear 46 is in mesh with a gear 46′ having 19 teeth and which gear 46′ is fixed to shaft E1. Also integrally attached to shaft B2 is a gear 47 having 12 teeth that meshes with a gear 48 having 45 teeth that is journaled on the output shaft E1 and adapted to be connected to, and disconnected from, shaft E1 by a clutch S that is splined to shaft E1.

The gear 28 meshes with the external gear 40 of the reactor 41 and is adapted to be connected to, and disconnected from, shaft D3 by a clutch P; while another gear 49 having 28 teeth also meshes with gear 40 of reactor 41 and gear 49 is adapted to be connected to, and disconnected from, shaft C3 by a clutch R.

The shaft B1 to which sun gear 45 is fixed also journals a gear 50 having 21 teeth that meshes with a gear 51 having 25 teeth fixed to a shaft 52 parallel to shaft B1. A gear 53 having 21 teeth is also journaled on shaft B1 and it meshes with a gear 54 having 35 teeth also fixed to shaft 52. A double-acting clutch L-H is adapted alternatively to connect to and disconnect from shaft B1, the gears 50 and 53. Gear 53 meshes with gear 11 which is indicated by the dot and dash lines in the stretchout schematic diagram.

A variable displacement hydraulic pump and motor unit 56 is drivingly connected to gear 12 through a gear 56′ and it is in a closed circuit with a fixed displacement pump or motor unit 57 which latter is fixed to a shaft 58. A gear 59 having 14 teeth is driven from shaft 58 and it meshes with the external gear 24 of the reactor of the D planetary.

The variable displacement unit 56 may be of the type shown and described in Patent No. 1,931,969 granted to H. Thoma on October 24, 1933. This type of unit includes a control lever 60 that may be moved from its solid line position through a horizontal position to its dotted line position. In its number 1 position, the pump will rotate at full speed in one direction. In its horizontal or number 2 position, the pump idles and delivers or transmits no fluid. In its number 3 position, the pump will rotate at full speed in a direction opposite to that in which it rotated when lever 60 was in its number 1 position.

In order to clearly understand the principles of the invention, the flow of power with corresponding speeds and torques will be traced through the transmission.

Assume that the transmission is adapted to transmit 40 H.P. over a 13.5:1 constant horsepower range with a top speed of 1800 r.p.m. and with an input speed of 2100 r.p.m.

The range of output speeds at constant horsepower will be $$1800 \text{ to } \frac{1800}{13.5} \text{ or } 1800 \text{ to } 134$$

From 134 r.p.m. to zero, the H.P. will decrease as a constant torque device. This constant torque will be $$\frac{\text{H.P.} \times 63{,}000}{134} = \frac{40 \times 63{,}000}{134} = 18{,}800 \text{ inch pounds}$$

and represents the safe maximum torque that can be applied to the shaft E1.

With clutches L, N, X, S and Q engaged (FIG. 1), the lever 60 in the solid line number 1 position, and shaft A1 rotating at 2100 r.p.m. by a constant speed prime mover, not shown, power flows from shaft A1 through gears 10, 11, 12, 13 to the D planetary. It also flows through gears 10, 11, 53, 54, shaft 52, gears 51 and 50, clutch L to shaft B1. Rotation of gear 12 causes pump 56 to deliver liquid under pressure at a predetermined pressure and maximum volume per revolution (with lever 60 in the number 1 position shown in FIG. 1) to pump 57 which supplies power through gears 59 and 24 to provide a re-action to effect the power flowing to shaft D1 to pass through the D planetary to the shaft D2. From shaft D2 the power is transmitted to the reactor 41 of the B planetary through the gear train including gears 26, 25, 38, 39 and 40.

Units 56 and 57 are commercial items and may be selected so that the maximum displacement of unit 56 will rotate shaft 58 at, for example, 1917 r.p.m. in one direction when lever 60 is at its uppermost position and at 1917 r.p.m. in the opposite direction when lever 60 is in its lowermost position with shaft A1 rotating at 2100 r.p.m. When lever 60 is in its intermediate position, no pumping occurs. With shaft A1 rotating at 2100 r.p.m. the speed of shaft $$C1 = 2100 \times \frac{21}{63} = 700 \text{ r.p.m.}$$

and that of $$D1 = 700 \times \frac{72}{40} = 1260 \text{ r.p.m.}$$

The base speed of a planetary differential is the speed of the arm with the reactor held against rotation. Rotation of the reactor in a direction corresponding to the direction of rotation of the sun gear increases the speed of rotation of the arm above base speed, while rotation of the reactor in a direction opposite to that of the sun gear decreases the speed of rotation of the arm below base speed.

The speed of the various elements will be indicated in the following text and charts by prefixing the element's index with the letter "S." Thus, the speed of elements D2, L1, BR, B2, E1, DR, B1, D1, C2, C1, CR, C3, AR, A2, A1 and D3 will be SD2, SL1, SBR, SB2, SE1, SDR, SB1, SD1, SC2, SC1, SCR, SC3, SAR, SA2, SA1 and SD3.

Additionally, the torques on the various elements will be represented by the prefix T and the power in them will be represented by the prefix P. Thus the torque on the B reactor 41 will be represented as TBR and the power therein as PBR, and so on.

Let:

$bs$ = arm r.p.m. at base speed
$sd$ = arm r.p.m. with sun gear fixed and such that reactor is rotating in same direction as sun if sun were released.
$so$ = arm r.p.m. with sun gear fixed and such that reactor is rotating opposite to sun if sun were released.
$rds$ = arm r.p.m. with reactor revolving in same direction as sun.
$ros$ = arm r.p.m. with reactor revolving oppositely to sun.

$$bs = \frac{s'}{r'+s'} \text{ (speed sun)}$$

$$sd \text{ and } so = \frac{r'}{r'+s'} \text{ (speed reactor)}$$

$rds = bs + sd$
$ros = bs - so$ where $s'$ and $r'$ are the number of teeth on the sun gear and reactor gear.

"D" PLANETARY

Referring to FIG. 1, assume that the reactor 24 is rotating in the same direction as the sun 15 and is driven by the unit 56 with lever 60 in its upper position. This produces a speed of 1917 r.p.m. of shaft 58. If shaft 58 drives gear 59 in a 1:1 ratio, the maximum speed of the D reactor when rotating in the same direction as sun gear 15 is:

$$SDR = 1917 \times \frac{14}{115} = 233.3 \text{ r.p.m. (max.)}$$

with lever 60 in its upper position.

The maximum speed of the D reactor when rotating oppositely to that of sun 15 is:

$$SDR = 1917 \times \frac{14}{115} = 233.3 \text{ r.p.m. (max.)}$$

with lever 60 in its lower position.

$$Dbs = \frac{40}{72+40}(1260) = \frac{40}{112} \times 1260 = 450 \text{ r.p.m.}$$

of SD2 with lever 60 central.

$$Dsd = \frac{72}{72+40}(233.3) = \frac{72}{112} \times 233.3 = 150 \text{ r.p.m.}$$

of SD2 with sun fixed and such that reactor is rotating in same direction as sun 15 if the sun were released.

$$Dso = \frac{72}{72+40}(233.3) = 150 \text{ r.p.m.}$$

of SD2 with sun fixed and such that reactor is rotating oppositely to sun 15 if the sun were released.

$Drds$=SD2 with reactor of D planetary rotating in same direction as sun 15.

$SD2=Dbs+Dsd=450+150=600$ r.p.m. when lever 60 is up.

$Dros$=SD2 with reactor of D planetary rotating oppositely to that of sun 15.

$SD2=Dbs-Dso=450-150=300$ with lever 60 down.

"C" PLANETARY

Figure 2:
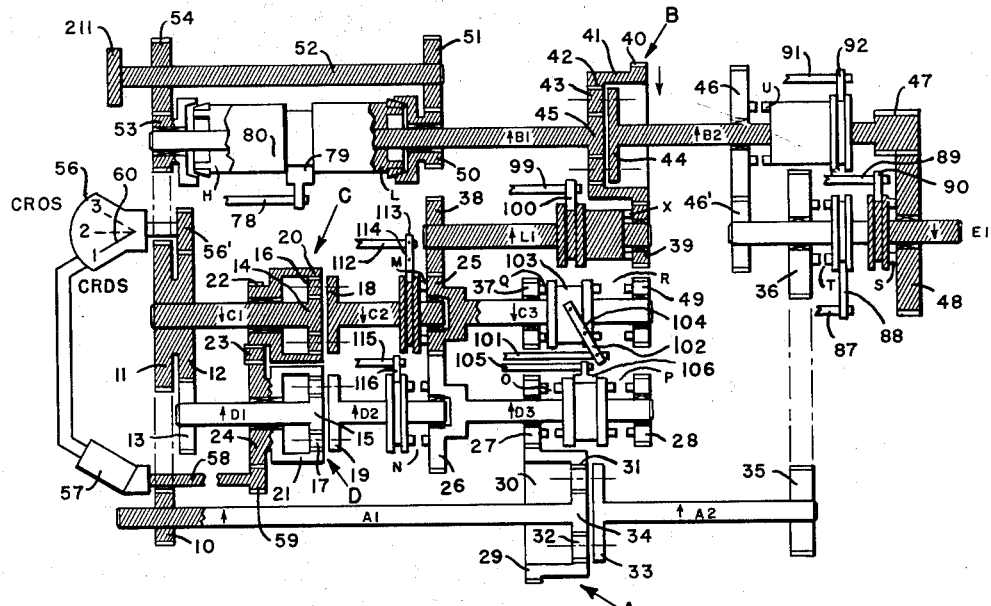

Referring to FIG. 2, assuming that the reactor 20 of the C planetary is rotating in the same direction as sun gear 14 and is driven by unit 56 with lever 60 in its lower position, a speed of 1917 r.p.m. of shaft 58 will be produced.

Therefore, the maximum speed of the C reactor when rotating in the same direction as the sun 14 is:

$$SCR = 1917 \times \frac{14}{115} \times \frac{115}{69} = 388.9 \text{ r.p.m.}$$

with lever 60 in its down position.

And, when lever 60 is in its "up" position, the C reactor rotates oppositely to sun 14 and its maximum speed is:

$$SCR = 1917 \times \frac{14}{115} \times \frac{115}{69} = 388.9 \text{ r.p.m.}$$

with lever 60 in its upper position.

$$Cbs = \frac{40}{72+40}(700) = \frac{40}{112} \times 700 = 250 \text{ r.p.m.}$$

of SC2 with lever 60 central.

$$Csd = \frac{72}{112} \times 388.9 = 250 \text{ r.p.m.}$$

of SC2 with C reactor rotating in same direction as sun if sun were released.

$$Cso = \frac{72}{112} \times 388.9 = 250 \text{ r.p.m.}$$

with C reactor rotating oppositely to sun 14 if sun were released.

$Crds$=SC2 with reactor of C planetary rotating in same direction as sun 14.

$SC2=Cbs+Csd=250+250=500$ r.p.m. with lever 60 in its lower position.

$Cros$=SC2 with reactor of C planetary rotating oppositely to sun 14.

$SC2=Cbs-Cso=250-250=0$ r.p.m. with lever 60 in its upper position.

"A" PLANETARY

Referring to FIG. 8, it is noted that the reactor 30 of the A planetary rotates in the same direction as sun gear 34. Also, it is being driven through the D planetary. This is the only phase of operation of the transmission wherein this condition occurs. Although lever 60 is shown in its lower position in FIG. 8, and hence SD2 is minimum to begin with, when lever 60 has been moved to its upper position in this phase, the reactor 21 of the D planetary is rotating in the same direction as sun gear 15 and consequently $SD2=600$ r.p.m. maximum. The maximum speed of the reactor 30 of the A planetary when rotating in the same direction as sun 34 is $$SAR = SD2(\text{max.}) \times \frac{35}{21} \times \frac{28}{56} = 600 \times \frac{35}{21} \times \frac{28}{56} = 500 \text{ r.p.m.}$$

Figure 5:
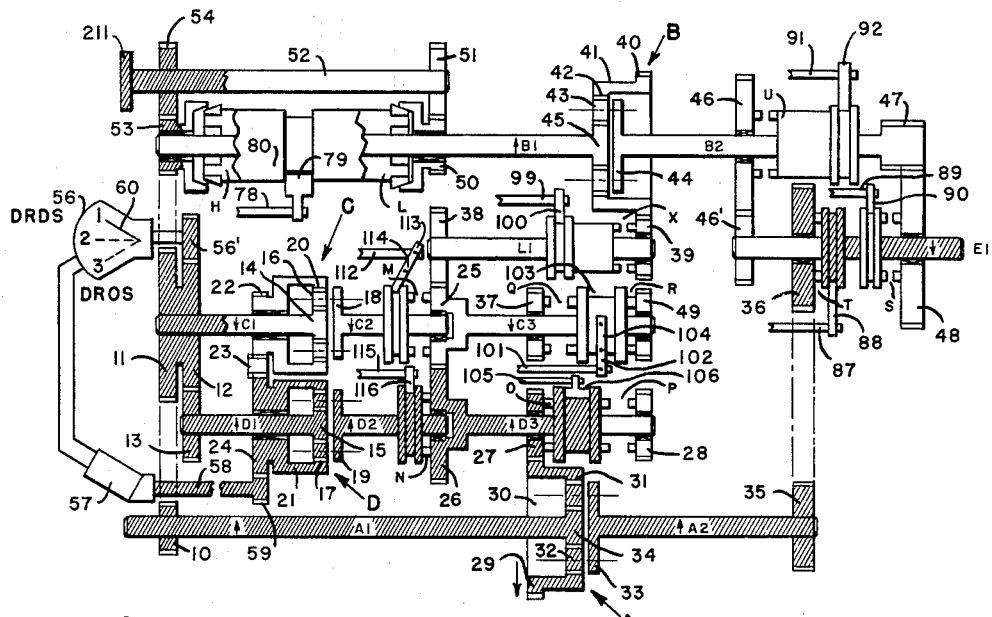

Referring to FIG. 5, the reactor of the A planetary rotates in the opposite direction to sun gear 34. Also, it is driven through the D planetary. This is the only phase of operation of the transmission wherein this condition occurs.

With lever 60 in its upper position (FIG. 5), the D reactor rotates in the same direction as the sun gear 15 and, therefore, $SD2=$max.$=600$ r.p.m.; and, the maximum speed of the reactor of the A planetary when rotating oppositely to sun 34 is $$600 \times \frac{28}{56} = 300 \text{ r.p.m.}$$

$$Aso = \frac{60}{60+20}(300) = \frac{3}{4} \times 300 = 225 \text{ r.p.m.}$$

of SA2 when lever 60 is central.

$$Abs = \frac{20}{60+20}(2100) = 525 \text{ r.p.m.}$$

of SA2 with sun fixed but reactor rotating in same direction as sun gear 34 if sun gear were released.

$$Asd = \frac{60}{60+20}(500) = \frac{3}{4} \times 500 = 375 \text{ r.p.m.}$$

of SA2 with sun gear fixed but reactor rotating oppositely to sun gear 34 if sun gear were released.

$Ards$=SA2 with reactor of A planetary rotating at maximum speed in same direction as sun 34.

$SA2=Abs+Asd$.

$SA2=525+375=900$ r.p.m. when lever 60 is in its low position.

$Aros$=SA2 with reactor of planetary A rotating at maximum speed opposite to sun 34.

$SA2=Abs-Aso$.

$SA2=525-225=300$ r.p.m. when lever 60 is in its upper position.

"B" PLANETARY (1500 R.P.M. OF B1)

Figure 4:
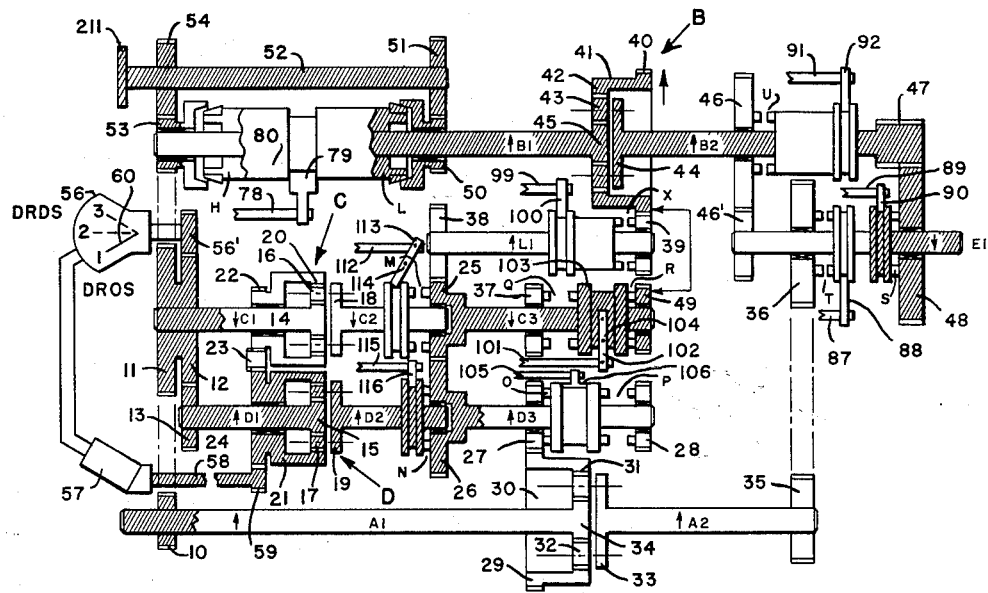

Referring to FIG. 4, the B reactor 41 is rotating in the same direction as the sun gear 45 and is being driven through the D planetary. With lever 60 in its lowermost position (FIG. 4), the D reactor rotates oppositely to sun 15 and hence SD2 is minimum=300 r.p.m. (column 7). However, during phase 4, lever 60 is moved to its upper position where SD2 is maximum=600 r.p.m. Therefore, the maximum speed of the reactor 41 of the B planetary in rotating in the same direction as the sun gear 45 is:

$$SBR = SD2(\text{max.}) \times \frac{35}{21} \times \frac{28}{56} = 600 \times \frac{35}{21} \times \frac{28}{56} = 500 \text{ r.p.m.}$$

Referring to FIG. 1, the B reactor 41 is rotating oppositely to the sun gear 45 and is being driven through the D planetary. With lever 60 in its uppermost position (FIG. 1), the D reactor rotates in the same direction as sun 15 and hence SD2 is maximum=600 r.p.m. Therefore, the maximum speed of the reactor 41 of the B planetary in rotating oppositely to sun 45 is:

$$SBR = SD2(600) \times \frac{35}{21} \times \frac{21}{21} \times \frac{28}{56} = 500 \text{ r.p.m.}$$

$$B_{15}bs = \frac{20}{60+20}(1500) = \frac{1}{4} \times 1500 = 375 \text{ r.p.m.}$$

of SB2 with lever 60 central.

$$B_{15}sd = \frac{60}{60+20}(500) = \frac{3}{4} \times 500 = 375 \text{ r.p.m.}$$

of SB2 with sun fixed but B reactor rotating in the same direction as sun 45 if sun were released.

$$B_{15}so = \frac{60}{60+20}(500) = 375 \text{ r.p.m.}$$

of SB2 with sun fixed but B reactor rotating oppositely to sun 45 if sun were released.

$B_{15}rds=SB2$ with reactor of B planetary rotating in the same direction as sun 45.

$SB2=B_{15}bs+B_{15}sd$.

$SB2=375+375=750$ r.p.m. (max.) with lever 60 in its lower position.

$B_{15}ros=SB2$ with reactor of B planetary rotating oppositely to sun 45.

$SB2=B_{15}bs-B_{15}so$.

$SB2=375-375=0$ r.p.m. (min.) with lever 60 in its upper position.

"B" PLANETARY (2100 R.P.M. OF B1)

Figure 12:
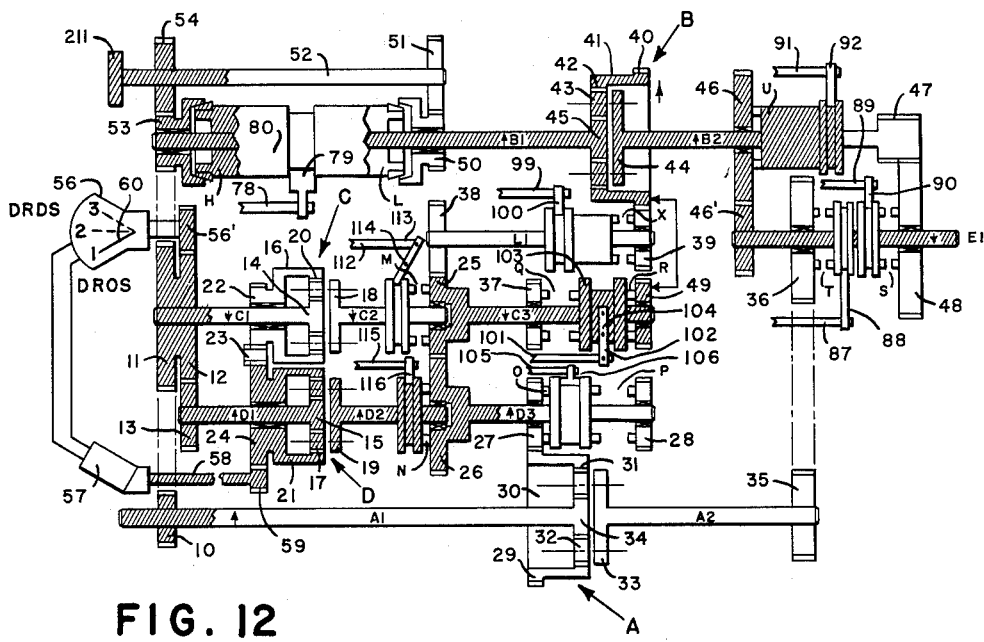

Referring to FIG. 12, the B reactor 41 is rotating in the same direction as sun 45 and is driven through the D planetary. With lever 60 in its lower position, the reactor of the D planetary rotates oppositely to sun 15 and hence SD2 is minimum or 300 r.p.m. However, during phase 12, the lever 60 is moved to its upper position where the reactor and sun of D planetary rotate in the same direction and SD2 is maximum=600 r.p.m. Therefore, the maximum speed of B reactor 41 in rotating in the same direction as sun 45 is:

$$SBR=SD2(\text{max.})\times\frac{35}{21}\times\frac{28}{56}=600\times\frac{35}{21}\times\frac{28}{56}=500 \text{ r.p.m.}$$

Figure 9:
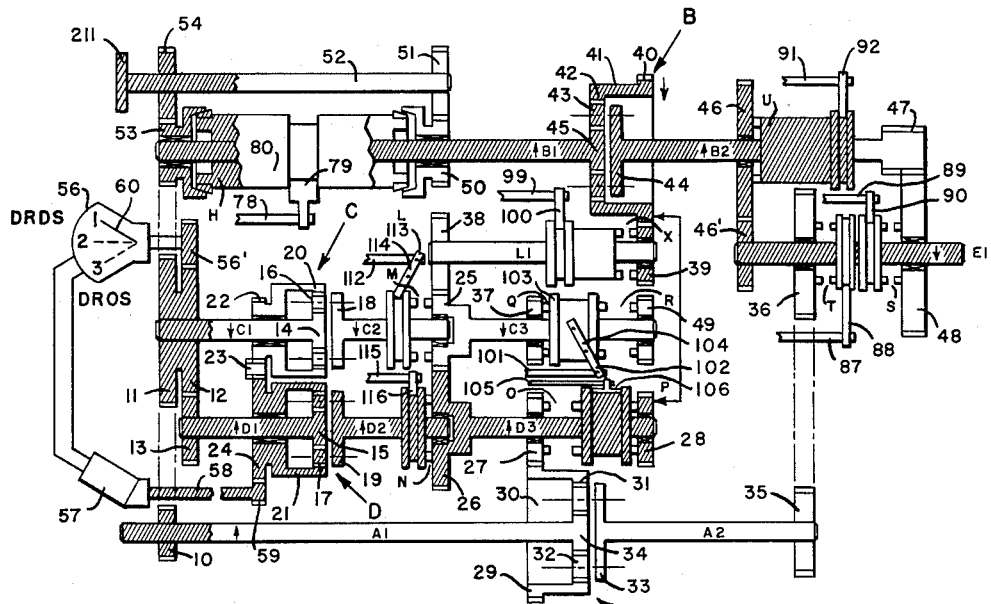

Referring to FIG. 9, the B reactor 41 is rotating oppositely to sun 45 and is driven through the D planetary. With lever 60 in its upper position, the reactor of the D planetary rotates in the same direction as the sun 15 and SD2 is maximum=600 r.p.m. Therefore, the maximum speed of the reactor 41 of the B planetary in rotating oppositely to sun 45 is:

$$SBR=SD2(\text{max.})\times\frac{28}{56}=600\times\frac{1}{2}=300 \text{ r.p.m.}$$

$$B_{21}bs=\frac{20}{60+20}(2100)=\frac{1}{4}\times 2100=525 \text{ r.p.m.}$$

of SB2 with lever 60 central.

$$B_{21}sd=\frac{60}{60+20}(500)=\frac{3}{4}\times 500=375 \text{ r.p.m.}$$

of SB2 with sun fixed but B reactor rotating in the same direction as sun 45 if sun were released.

$$B_{21}so=\frac{60}{60+20}(300)=\frac{3}{4}\times 300=225 \text{ r.p.m.}$$

of SB2 with sun fixed but B reactor rotating oppositely to sun 45 if sun were released.

$B_{21}rds=SB2$ with reactor of B planetary rotating in same direction as sun 45.

$SB2=B_{21}bs+B_{21}sd$.

$SB2=525+375=900$ r.p.m. (max.) with lever 60 in its lower position.

$B_{21}ros=SB2$ with reactor of B planetary rotating oppositely to sun 45.

$SB2=B_{21}bs-B_{21}so$.

$SB2=525-225=300$ r.p.m. (max.) with lever 60 in its upper position.

The foregoing may be summarized as follows:

SUMMARY

| SD2 Shaft, r.p.m. | Rotation of D Reactor | Lever 60 |
|---|---|---|
| 300 (max.) | Opposite to sun 15 | Lower position. |
| 450 (base speed) | 0 | Central position. |
| 602 (max.) | Direction of sun 15 | Upper position. |

| SC2 Shaft, r.p.m. | Rotation of C Reactor | Lever 60 |
|---|---|---|
| 500 (max.) | Direction of sun 14 | Lower position. |
| 250 (base speed) | 0 | Central position. |
| 0 | Opposite to sun 14 | Upper position. |

| SA2 Shaft r.p.m. | Rotation of A Reactor | Lever 60 |
|---|---|---|
| 900 (max.) | Direction of sun 34 | Lower position. |
| 525 (base speed) | 0 | Central position. |
| 300 (max.) | Opposite to sun 34 | Upper position. |

| SB2 Shaft (1500 r.p.m. of B1) | Rotation of B Reactor | Lever 60 |
|---|---|---|
| 750 (max.) | Same direction as sun 45 | Lower position. |
| 375 (base speed) | 0 | Central position. |
| 0 | Opposite to sun 35 | Upper position. |

| SB2 Shaft (2100 r.p.m. of B1) | Rotation of B Reactor | Lever 60 |
|---|---|---|
| 900 (max.) | Direction of sun 45 | Lower position. |
| 525 (base speed) | 0 | Central position. |
| 300 (max.) | Opposite to sun 45 | Upper position. |

In the following charts and in the drawings, the lever 60 will be shown in an upper, intermediate and lower position. The letters beside it will indicate the direction of rotation of the reactors of the planetaries D or C under consideration. Thus, $Drds=D$ reactor rotating in the direction of its sun; and $Dros=D$ reactor rotating opposite to its sun, and so on.

*Chart 1*

R.P.M. POWER LINE STAGE 1 40 H.P.

| Clutch | Lever 60 Pos. | SD2 | SL1 | SBR | SB2 | SE1 | SDR | SB1 | SD1 |
|---|---|---|---|---|---|---|---|---|---|
| LNXSQ | 1 Drds | 600 | 1,000 | 550 | 0 | 0 | 233.3 | 1,500 | 1,260 |
| | 2 | 450 | 750 | 375 | 93.75 | 25 | 0 | 1,500 | 1,260 |
| | 3 Dros | 300 | 500 | 250 | 187.5 | 50 | 233.3 | 1,500 | 1,260 |

$SD2=Dbs+\frac{72}{72+40}\times SDR$, where $Dbs=$base speed of D planetary.

$SB2=Bbs+\frac{60}{60+20}\times SBR$, where $Bbs=$base speed of B planetary.

$SL1=SD2\left(\frac{35}{21}\right)$; $SBR=SL1\left(\frac{28}{56}\right)$; $SE1=SB2\left(\frac{12}{45}\right)$ $SDR=$(column 6).

$SB1=SA\times\frac{21}{63}\times\frac{63}{21}\times\frac{21}{35}\times\frac{25}{21}$; $SD1=SA\times\frac{21}{63}\times\frac{72}{40}$.

SHAFT TORQUE, IN./LBS.

| Lever 60 Pos. | TE1 | TB2 | TBR | TB1 | TD2 | TD1 | TDR |
|---|---|---|---|---|---|---|---|
| 1 Drds | 18,800 | 5,000 | 3,750 | 1,250 | 3,125 | 1,125 | 2,000 |
| 2 | 18,800 | 5,000 | 3,750 | 1,250 | 3,125 | 1,125 | 2,000 |
| 3 Dros | 18,800 | 5,000 | 3,750 | 1,250 | 3,125 | 1,125 | 2,000 |

$TB2 = TE1 \times \frac{12}{45}$; $TBR = \frac{3}{4} TB2$ (column 11); $TB1 = \frac{1}{4} TB2$ (column 11).

$TD2 = TBR \times \frac{35}{21} \times \frac{28}{56}$; $TD1 = TD2 \times \frac{2.5}{7}$ (column 12).

$TDR = TD2 \times \frac{4.5}{7}$ (column 12).

SHAFT HORSEPOWER H.P. $= \frac{T \times R.P.M.}{63,000}$

| Unit 56 | Lever 60 Pos. | PE1 | PB2 | PBR= PD2 | PB1 | PD2 | PD1 | PDR | PA= PB1−PBR (BR opposite sun 45) |
|---|---|---|---|---|---|---|---|---|---|
| 1 | Drds 1 | 0 | 0 | 29.9 | 29.9 | PD1+PDR 29.9 | 22.4 | 7.4 | 0 |
| 2 | 2 | 7.45 | 7.45 | 22.4 | 29.9 | PD1 22.5 | 22.4 | 0 | 7.5 |
| 3 | Dros 3 | 14.9 | 14.9 | 14.9 | 29.9 | PD1−PDR 14.9 | 22.4 | 7.4 | 14.9 |

From the above chart it is evident that as the hand lever 60 (FIG. 1) moves from its solid line position (1) to its dotted line position (3), the B reactor 41 rotates from 550 r.p.m. to 250 r.p.m., with the B reactor 41 rotating in a direction opposite to that of the sun gear 45. Furthermore, the speed of shaft E1 varies from 0 to 50 r.p.m. as lever 60 is moved from position 1 to position 3.

Since the output torque of 18,800 inch pounds is constant from zero r.p.m. of shaft E1 to 134 r.p.m., the torque from the three positions of lever 60 of FIG. 1 is 18,800 inch pounds. The torque $$TB2 = \frac{12}{45} \times TE1$$

The torque on the B reactor $= TBR = \frac{3}{4} TB2$, which is derived as follows:

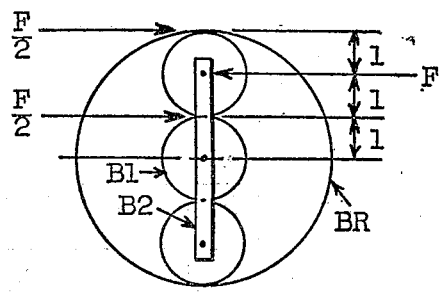

$TB2 = F \times 2$ or $F = \frac{TB2}{2}$ $TB1 = \frac{F}{2} \times 1 = \frac{TB2}{4}$ $TBR = \frac{F}{2} \times 3 = 3\left(\frac{TB2}{4}\right) = \frac{3}{4} TB2$ The torque on $TD1 = TD2 \times \frac{2.5}{7}$ derived as follows, assuming a diametral pitch of 8 for the planetary gears:

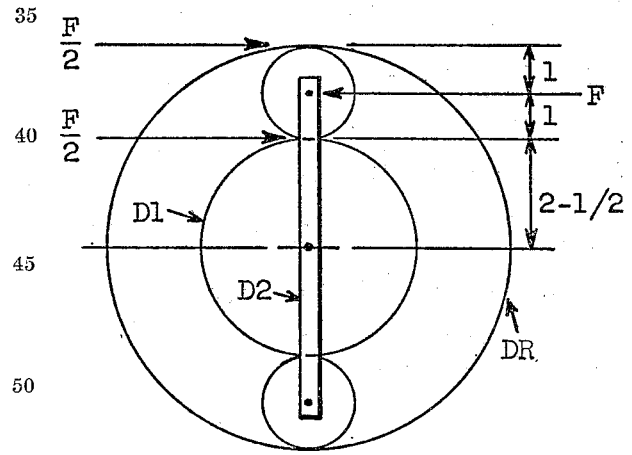

$\frac{72}{8} = \frac{9}{2}(pd) = 4.5''$ rad. Reactor $\frac{16}{8} = \frac{2}{2}(pd) = 1''$ rad. Planet $\frac{40}{8} = \frac{5}{2}(pd) = 2\frac{1}{2}''$ rad. Sun $TD2 = 3.5 \times F$ $F = \frac{TD2}{3.5}$ $TD1 = 2.5 \times \frac{F}{2} = \frac{2.5}{1} \times \frac{\frac{TD2}{3.5}}{\frac{2}{1}} = \frac{2.5 TD2}{7}$ And, the torque:

$TDR = 4.5 \times \frac{F}{2} = 4.5 \times \frac{\frac{TD2}{3.5}}{\frac{2}{1}} = \frac{4.5 TD2}{7}$ From a study of the accompanying Chart 1 and assuming 100% efficiency, it is evident that the power input at A1 is equal to the power output at E1 and is the algebraic sum of the power passing through the B planetary, namely, the algebraic sum of the power in B1 that is transmitted thereto through gear train 10, 11, 53, 54, 51, 50, and the power at the B reactor 41 which is made up from the power through the sun 15 and the reactor 24 of the D planetary, and which latter is transmitted to the B reactor 41 through the gear train 26, 25, 38, 39 and 40. Since the B reactor 41 is rotating oppositely to the sun 45, the power at the B reactor 41 subtracts from the power in shaft B1 and $PA=PB1-PBR$.

Accordingly, in moving lever 60 from its number 1 position to its number 3 position, the speed of E1 varies from 0 to 50 r.p.m. with the power varying from 0 to 14.9 HP. At 50 r.p.m. of the E1 shaft, it is to be noted that the speed of shafts L1 and C3 is 500 r.p.m. and the speed of shaft $C2=Crds=Cbs+Csd=500$ r.p.m. (column 7).

Accordingly, the clutch M (FIG. 2) may be engaged and clutch N disengaged since shaft C2 and gear 25 are both rotating at 500 r.p.m. This causes the power to flow through the transmission in the same manner as it did in FIG. 1, except that the power to the B reactor 41 is now transmitted through the C planetary instead of the D planetary, and through the gear train 25, 38, 39 and 40. Since the B reactor is still rotating oppositely to the sun 45, the power at the B reactor subtracts from the power at B1.

As will be explained later, the control for the transmission will cause the speeds of shaft C2 and C3 to be slightly non-synchronous at the speed at which clutch M is to be engaged in order to prevent tooth-on-tooth contact of the positive tooth clutches. In order to avoid rendering this portion of the description more complex, it will refer to an exact synchronous speed at which the various clutches are shifted.

*Chart 2*

R.P.M. POWER LINE STAGE 2 40 H.P.

| Clutch | Lever 60 Pos. | SC2 | SL1 | SBR | SB2 | SE1 | SB1 | SC1 | SCR |
|---|---|---|---|---|---|---|---|---|---|
| | 1 Crds | 500 | 500 | 250 | 187.5 | 50 | 1,500 | 700 | 388.8 |
| LMXSQ | 2 | 250 | 250 | 125 | 281.25 | 75 | 1,500 | 700 | 0 |
| | 3 Cros | 0 | 0 | 0 | 375 | 100 | 1,500 | 700 | 388.8 |

$SB2 = Bbs + \frac{60}{60+20} \times SBR$, where $Bbs$=base speed of B planetary.

$SC2 = Cbs + \frac{72}{72+40} \times SCR$, where $Cbs$=base speed of C planetary.

$SL1 = SC2 \times \frac{21}{21}$; $SC1 = SA \times \frac{21}{63}$; $SCR=$(column 7).

$SBR = SL1 \times \frac{28}{56}$ (opposite sun 45); $SB1 = SA \times \frac{21}{63} \times \frac{63}{21} \times \frac{21}{35} \times \frac{25}{21}$.

$SE1 = SB2 \times \frac{12}{45}$.

SHAFT TORQUE, IN./LBS.

| Lever 60 Pos. | TE1 | TB2 | TBR | TB1 | TC2 | TC1 | TCR |
|---|---|---|---|---|---|---|---|
| 1 | 18,800 | 5,000 | 3,750 | 1,250 | 1,875 | 670 | 1,205 |
| 2 | 18,800 | 5,000 | 3,750 | 1,250 | 1,875 | 670 | 1,205 |
| 3 | 18,800 | 5,000 | 3,750 | 1,250 | 1,875 | 670 | 1,205 |

$TB2 = TE1 \times \frac{12}{45}$; $TBR = \frac{3}{4} TB2$ (column 11); $TB1 = \frac{1}{4} TB2$ (column 11).

$TC2 = TBR \times \frac{28}{56}$.

$TC1 = TC2 \times \frac{2.5}{7}$; $TCR = TC2 \times \frac{4.5}{7}$ (similar to derivation for D reactor, column 12).

SHAFT HORSEPOWER $H.P. = \frac{T \times R.P.M.}{63,000}$

| Unit 56 | Lever 60 Pos. | PE1 | PB2 | PBR= PC2 | PB1 | PC2 | PC1 | PCR | PA= PB1−PBR (BR opposite sun 45) |
|---|---|---|---|---|---|---|---|---|---|
| 3 | Cros 1 | 14.9 | 14.9 | 14.9 | 29.8 | PC1+PCR 14.9 | 7.45 | 7.45 | 14.9 |
| 2 | 2 | 22.4 | 22.4 | 7.45 | 29.8 | PC1 7.45 | 7.45 | 0 | 22.4 |
| 1 | Crds 3 | 29.8 | 29.9 | 0 | 29.8 | PC1−PCR 0 | 7.45 | 7.45 | 29.8 |

From an inspection of Chart 2 and FIG. 2, it is evident that by moving lever 60 from its number 1 solid line position back to its number 3 dotted line position, the speed of E1 varies from 50 r.p.m. to 100 r.p.m., and the power of E1 varies from 14.9 H.P. to 29.8 H.P.

Figure 3:
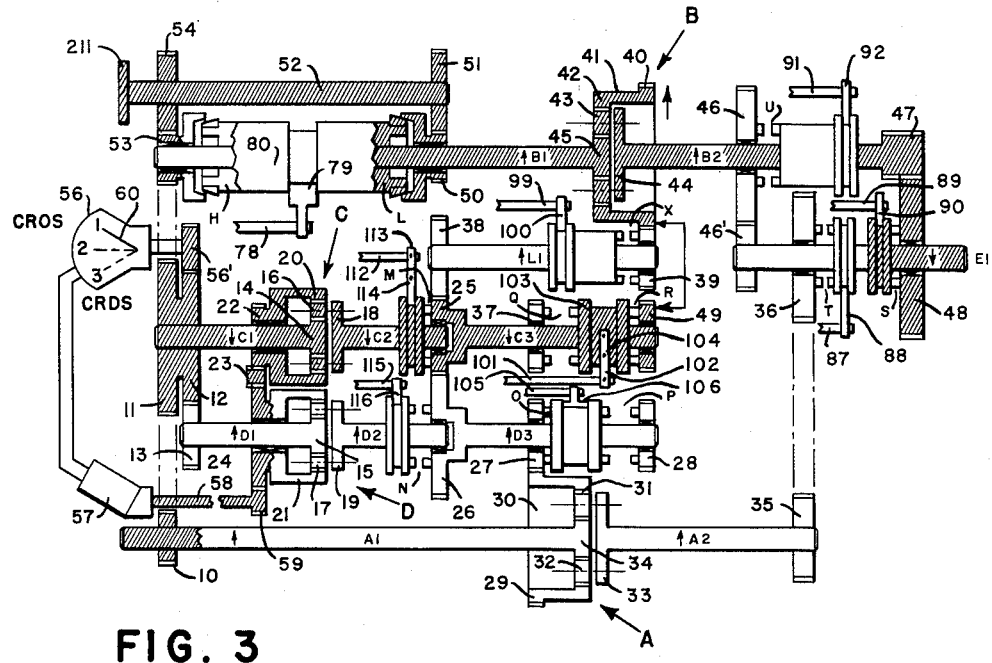

When the lever 60 is in its number 3 position (FIG. 2), the speed of the B reactor 41 is zero, as is the speed of the C2 and C3 shafts. Accordingly, clutch R may be engaged and clutch X disengaged. This sets up the transmission for phase 3 as shown in FIG. 3. The power now flows to the B reactor 41 through the C planetary but through the gear train 49 and 40. Since the L1 shaft and gears 38 and 39 are not in this gear train, the B reactor 40 now rotates in the same direction as sun 45 and, therefore, its power adds to that of B1. As previously described, reactor 41 has stopped at the end of phase 2, so that as lever 60 is now moved during phase 3 from its number 1 position to its number 3 position, the reactor 41 rotates at speeds increasing from zero and in the same direction that the sun 45 is rotating.

Chart 3
R.P.M. POWER LINE STAGE 3 40 H.P.

| Clutch | Lever 60 Pos. | SC2 | SC3 | SBR | SB2 | SE1 | SB1 | SC1 | SCR |
|---|---|---|---|---|---|---|---|---|---|
| LMRSO | 1 Cros | 0 | 0 | 0 | 375 | 100 | 1,500 | 700 | 388.8 |
|  | 2 | 250 | 250 | 125 | 468.75 | 125 | 1,500 | 700 | 0 |
|  | 2A | 340 | 340 | 170 | 503 | 134 | 1,500 | 700 | 139 |
|  | 3 Crds | 500 | 500 | 250 | 562.5 | 150 | 1,500 | 700 | 388.8 |

$SB2 = Bbs + \frac{60}{60+20} \times SBR$, where $Bbs$ = base speed of B planetary.

$SC2 = Cbs + \frac{72}{72+40} \times SCR$, where $Cbs$ = base speed of C planetary.

$SC3 = SC2$; $SBR = SC3 \times \frac{28}{56}$ (direction of sun 45); $SE1 = SB2 \times \frac{12}{45}$.

$SB1 = SA \times \frac{21}{63} \times \frac{63}{21} \times \frac{21}{35} \times \frac{25}{21}$; $SC1 = SA \times \frac{21}{63}$; $SCR$ = (column 7).

SHAFT TORQUE, IN./LBS.

| Lever 60 Pos. | TE1 | TB2 | TBR | TB1 | TC2 | TC1 | TCR |
|---|---|---|---|---|---|---|---|
| 1 Cros | 18,800 | 5,000 | 3,750 | 1,250 | 1,875 | 670 | 1,205 |
| 2 | 18,800 | 5,000 | 3,750 | 1,250 | 1,875 | 670 | 1,205 |
| 2A | 18,800 | 5,000 | 3,750 | 1,250 | 1,875 | 670 | 1,205 |
| 3 Crds | 16,800 | 4,475 | 3,355 | 1,120 | 1,675 | 600 | 1,075 |

$TB2 = TE1 \times \frac{12}{45}$; $TBR = \frac{3}{4} TB2$ (column 11); $TB1 = \frac{1}{4} TB2$ (column 11).

$TC2 = TBR \times \frac{28}{56}$.

$TC1 = TC2 \times \frac{2.5}{7}$; $TCR = TC2 \times \frac{4.5}{7}$ (similar to derivation for D reactor, column 12).

SHAFT HORSEPOWER $H.P. = \frac{T \times R.P.M.}{63,000}$

| | Lever 60 Pos. | PE1 | PB2 | PBR = PC2 | PB1 | PC2 | PC1 | PCR | PA = PB1+PBR (BR=direction sun 45) |
|---|---|---|---|---|---|---|---|---|---|
| 1 | Cros 1 | 29.8 | 29.8 | 0 | 29.8 | PC1−PCR 0 | 7.45 | 7.45 | 29.8 |
| 2 | 2 | 37.4 | 37.5 | 7.45 | 29.8 | PC1 7.45 | 7.45 | 0 | 37.4 |
|  | 2A | 40 | 40 | 10.2 | 29.8 | PC1+PCR 10.2 | 7.45 | 2.75 | 40 |
| 3 | Crds 3 | 40 | 40 | 13.25 | 26.7 | PC1+PCR 13.25 | 6.65 | 6.65 | 40 |

From an inspection of Chart 3, it is evident that the speed of E1 increases from 100 r.p.m. to 150 r.p.m., and the power output varies from 29.8 H.P. to 40 H.P. The output horsepower of reactor 40 is achieved when lever 60 is at its number 2A position when shaft $E1 = 134$ r.p.m. No further increase in power can be delivered from shaft E1 since only 40 H.P. is supplied to shaft A1. Therefore, as the speed of E1 increases above 134 r.p.m., the available torque begins to fall off.

During phase 3 (FIG. 3), the power flowing through the B planetary is made up of the algebraic sum of the power in B1 and that of the B reactor 41, which latter is made up of the power from the C planetary. The power from the C planetary is the algebraic sum of the power from shaft C1 and from C reactor 20. Since C reactor 20 is rotating in the opposite direction from sun gear 14 when lever 60 is between its number 1 and 2 positions, the reactor power subtracts from the C1 power; and since C reactor 20 rotates in the same direction as the sun gear 14 when lever 60 is between its number 2 and 3 positions, the C reactor power adds to the C1 power.

When the lever 60 is in its number 3 position (FIG. 3), at the beginning of phase 4 and end of phase 3, the speed of shaft $D2=SD2=Dbs-Dso$ (cols. 6 and 7) $=450-150=300$ r.p.m. Since at this point, $$SD3=SC2\times\frac{21}{35}=500\times\frac{21}{35}=300 \text{ r.p.m.}$$

clutch N can be engaged and clutch M disengaged (FIG. 4).

Referring to FIG. 4, the power still flows to the B reactor through the gear train 49 and 40, but from the D planetary instead of the C planetary.

*Chart 4*
R.P.M. POWER LINE STAGE 4 40 H.P.

| Clutch | Lever 60 Pos. | SD2 | SC3 | SBR | SB2 | SE1 | SB1 | SD1 | SDR |
|---|---|---|---|---|---|---|---|---|---|
| LNRSO | 1 Dros | 300 | 500 | 250 | 562.5 | 150 | 1,500 | 1,260 | 233.3 |
|  | 2 | 450 | 750 | 375 | 656 | 175 | 1,500 | 1,260 | 0 |
|  | 3 Drds | 600 | 1,000 | 500 | 750 | 200 | 1,500 | 1,260 | 233.3 |

$SD2=Dbs+\frac{72}{72+40}\times SDR$, where $Dbs$=base speed of D planetary.

$SB2=Bbs+\frac{60}{60+20}\times SBR$, where $Bbs$=base speed of B planetary.

$SC3=SD2\times\frac{35}{21}$; $SBR=SC3\times\frac{28}{56}$ (direction of sun 45);

$SE1=SB2\times\frac{12}{45}$; $SB1=SA\times\frac{21}{63}\times\frac{63}{21}\times\frac{21}{35}\times\frac{25}{21}$;

$SD1=SA\times\frac{21}{63}\times\frac{72}{40}$; $SDR=$(column 6).

SHAFT TORQUE, IN./LBS.

| Lever 60 Pos. | TE1 | TB2 | TBR | TB1 | TD2 | TD1 | TDR |
|---|---|---|---|---|---|---|---|
| 1 Dros | 16,800 | 4,475 | 3,355 | 1,120 | 2,780 | 1,000 | 1,780 |
| 2 | 14,400 | 3,830 | 2,880 | 955 | 2,400 | 855 | 1,545 |
| 3 Drds | 12,600 | 3,350 | 2,515 | 835 | 2,080 | 745 | 1,340 |

$TE1=\frac{40\times63,000}{SE1}$ $TB2=TE1\times\frac{12}{45}$; $TBR=\frac{3}{4}TB2$ (column 11); $TB1=\frac{1}{4}TB2$ (column 11).

$TD2=TBR\times\frac{35}{21}\frac{28}{56}$; $TD1=TD2\times\frac{2.5}{7}$ (column 12); $TDR=TD2\times\frac{4.5}{7}$ (column 12).

SHAFT HORSEPOWER H.P.$=\frac{T\times R.P.M.}{63,000}$

| Unit 56 | Lever 60 Pos. | PE1 | PB2 | PBR=PD2 | PB1 | PD2 | PD1 | PDR | PA=PB1+PBR (BR= direction of sun 45) |
|---|---|---|---|---|---|---|---|---|---|
| 3 | Drds 1 | 40 | 40 | 13.25 | 26.7 | PD1−PDR 13.25 | 20 | 6.6 | 40 |
| 2 | 2 | 40 | 40 | 17.2 | 22.8 | PD1 17.2 | 17.2 | 0 | 40 |
| 1 | Dros 3 | 40 | 40 | 20 | 20 | PD1+PDR 20 | 14.9 | 5 | 40 |

From an inspection of Chart 4, it is evident that movement of lever 60 from its number 1 position to its number 3 position causes SE1 to vary from 150 r.p.m. to 200 r.p.m.; and the power remains constant at 40 H.P.

When the lever 60 is at its number 3 position (FIG. 4) (FIG. 4), clutch T can be engaged and clutch S disengaged (FIG. 5).

Referring to FIG. 5, power now flows from shaft A1 through the A planetary to the output shaft E1, which power is the algebraic sum of the power in A1 and AR.

*Chart 5*

R.P.M. POWER LINE STAGE 5 40 H.P.

| Clutch | Lever 60 Pos. | SD1 | SD2 | SAR | SA2 | SA= SA1 | SDR | SE1 |
|---|---|---|---|---|---|---|---|---|
| LNRTO | 1 Drds | 1,260 | 600 | 300 | 300 | 2,100 | 233.3 | 200 |
| | 2 | 1,260 | 450 | 225 | 356.25 | 2,100 | 0 | 235 |
| | 3 Dros | 1,260 | 300 | 150 | 412.5 | 2,100 | 233.3 | 275 |

$SD2 = Dbs + \frac{72}{72+40} \times SDR$, where $Dbs$=base speed of D planetary.

$SA2 = Abs + \frac{60}{60+20} \times SAR$, where $Abs$=base speed of A planetary.

$SD1 = SA \times \frac{21}{63} \times \frac{72}{40}$; $SAR = SD2 \times \frac{28}{56}$ (opposite sun 34).

$SDR$=(column 6); $SE1 = SA2 \times \frac{24}{36}$.

SHAFT TORQUE, IN./LBS.

| Lever 60 Pos. | TE1 | TA2 | TAR | TA1 | TD2 | TD1 | TDR |
|---|---|---|---|---|---|---|---|
| 1 Drds | 12,600 | 8,390 | 6,290 | 2,090 | 3,145 | 1,120 | 2,025 |
| 2 | 10,700 | 7,125 | 5,340 | 1,780 | 2,670 | 950 | 1,720 |
| 3 Dros | 9,175 | 6,100 | 4,575 | 1,520 | 2,287 | 817 | 1,470 |

$TE1 = \frac{40 \times 63,000}{SE1}$; $TA2 = TE1 \times \frac{24}{36}$; $TAR = \frac{3}{4} TA2$; $TA1 = \frac{1}{4} TA2$.

$TD2 = TAR \times \frac{28}{56}$; $TD1 = TD2 \times \frac{2.5}{7}$ (column 12); $TDR = TD2 \times \frac{4.5}{7}$ (column 12). Derivation of TAR; TA1 similar to derivation for B reactor (column 11).

SHAFT HORSEPOWER H.P.$=\frac{T \times R.P.M.}{63,000}$

| Unit 56 | Lever 60 Pos. | PE1 | PA2 | PAR= PD2 | PA1 | PD2 | PD1 | PDR | PA= PA1−PAR (AR opposite sun 34) |
|---|---|---|---|---|---|---|---|---|---|
| 1 | Drds 1 | 40 | 40 | 29.9 | 70 | PD1+PDR 29.9 | 22.4 | 7.5 | 40 |
| 2 | 2 | 40 | 40 | 19.1 | 59.2 | PD1 19.2 | 19.2 | 0 | 40 |
| 3 | Dros 3 | 40 | 40 | 10.9 | 50.6 | PD1−PDR 10.9 | 16.3 | 5.5 | 40 |

$SD2 = SD3 = Dbs + Dsd = 600$ r.p.m. (column 7), and since clutch O is engaged, $$SAR = 600 \times \frac{28}{56} = 300 \text{ r.p.m.}$$

and rotating oppositely to the roation of the sun gear 34.

$SA2 = Abs - Aso$ (column 8); $SA2 = 525 - 225 = 300$ r.p.m.

Accordingly, $$\text{The speed of gear } 36 = 300 \times \frac{24}{36} = 200 \text{ r.p.m.}$$

Since $SE1 = 200$ with lever 60 at its number 3 position

Referring to Chart 5, it is evident that with lever 60 in its number 1 position, the circulating power in shaft A1 is 70 H.P.; however, since the rotation of the A reactor 30 is opposite to the direction of rotation of sun gear 34, the power in the A reactor 30 (PAR) subtracts from the circulating power in shaft A1, so that the power in A2 and E1 is 40 H.P. In moving lever 60 (FIG. 5) from its number 1 to its number 3 position, the speed of shaft E1 varies from 200 r.p.m. to 275 r.p.m., while the power remains constant at 40 H.P.

With lever 60 in its number 3 position (FIG. 5), the speed of D reactor 24 is $SDR = 233.3$ and is rotating in a direction opposite to that of the sun gear 15. Accordingly, the C reactor 20 is rotating in the same direction as the sun gear 14. Therefore, the speed of shaft C2 with lever 60 in its number 3 position (FIG. 5)=$SC2=Cbs$ tor 30 being supplied with power from the C planetary rather than from the D planetary.

*Chart 6*

R.P.M. POWER LINE STAGE 6 40 H.P.

| Clutch | Lever 60 Pos. | SC2 | SD3 | SAR | SA2 | SA= SA1 | SCR | SE1 |
|---|---|---|---|---|---|---|---|---|
| LMRTO | Crds 1 | 500 | 300 | 150 | 412.5 | 2,100 | 388.8 | 275 |
|  | 2 | 250 | 150 | 75 | 468.5 | 2,100 | 0 | 312.5 |
|  | Cros 3 | 0 | 0 | 0 | 525 | 2,100 | 388.8 | 350 |

$SC2 = Cbs + \frac{72}{72+40} \times SCR$, where $Cbs$=base speed of C planetary.

$SA2 = Abs + \frac{60}{60+20} \times SAR$, where $Abs$=base speed of A planetary.

$SD3 = SC2 \times \frac{21}{35}$; $SAR = SD3 \times \frac{28}{56}$; $SCR$=(column 7).

$SE1 = SA2 \times \frac{24}{36}$.

SHAFT TORQUE, IN./LBS.

| Lever 60 Pos. | TE1 | TA2 | TAR | TA1 | TC2 | TC1 | TCR |
|---|---|---|---|---|---|---|---|
| Crds 1 | 9,175 | 6,120 | 4,580 | 1,525 | 1,375 | 492 | 882 |
| 2 | 8,100 | 5,400 | 4,050 | 1,350 | 1,215 | 435 | 780 |
| Cros 3 | 7,200 | 4,800 | 3,600 | 1,200 | 1,080 | 386 | 694 |

$TE1 = \frac{40 \times 63,000}{SE1}$ $TA2 = TE1 \times \frac{24}{36} \times TC2 = TAR \times \frac{21}{35} \times \frac{28}{56}$ $TAR = TA2 \times \frac{3}{4}$
$TA1 = TA2 \times \frac{1}{4}$ } Similar to derviation for D reactor (column 12) { $TC1 = TC2 \times \frac{2.5}{7}$
$TCR = TC2 \times \frac{4.5}{7}$ SHAFT HORSEPOWER H.P.=$\frac{T \times R.P.M.}{63,000}$

| Unit 56 | Lever 60 Pos. | PE1 | PA2 | PAR= PC2 | PA1 | PC2 | PC1 | PCR | PA= PA1−PAR (AR= opposite sun 34) |
|---|---|---|---|---|---|---|---|---|---|
| 3 | Cros 1 | 40 | 40 | 10.9 | 51 | PC1+PCR 10.9 | 5.45 | 5.45 | 40 |
| 2 | 2 | 40 | 40 | 4.8 | 45 | PC1 4.8 | 4.83 | 0 | 40 |
| 1 | Crds 3 | 40 | 40 | 0 | 40 | PC1−PCR 0 | 4.28 | 4.28 | 40 |

$+Csd$=500 r.p.m. (column 7). At this same point, when lever 60 is at its number 3 position (FIG. 5):

$LD3 = SD2 = Dbs − Dso = 300$ r.p.m. (column 7)

∴ $SC3 = 300 \times \frac{35}{21} = 500$ r.p.m.

Figure 6:
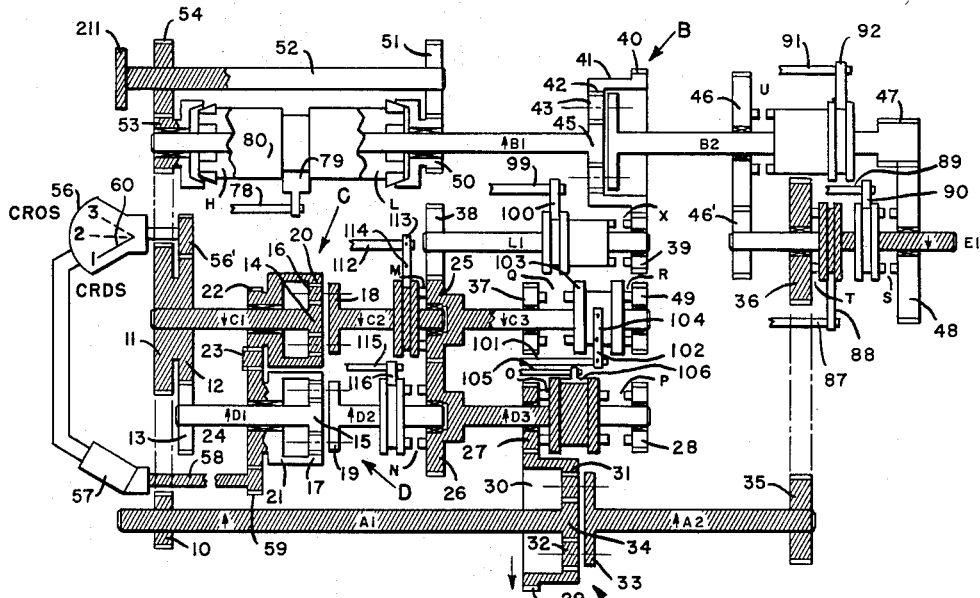

Accordingly, clutch M can be engaged and clutch N disengaged (FIG. 6).

The power now flows to the output shaft E1 through the A planetary as it did in phase 5, but with the A reactor 30 being supplied with power from the C planetary rather than from the D planetary.

In moving lever 60 from its number 1 position to its number 3 position, the speed of shaft E1 varies from 275 r.p.m. to 350 r.p.m., and the power in shaft E1 remains constantly 40 H.P.

Referring to FIG. 6 and Chart 6, it is noted that $SAR=0$ when lever 60 is in its number 3 position. Also, since gear 37 is in mesh with the A reactor gear 29, it also is at zero speed when the lever 60 (FIG. 6) is in its number 3 position. Also, $SC2=SC3=0$ at this point in the cycle, so that clutch Q can be engaged and clutch O disengaged. The power now flows to E1 through the A planetary, but the A reactor 30 is driven by gear 37 instead of gear 27 so that movement of lever 60 between its number 1 and number 3 position (FIG. 7) causes rotation of the A reactor gear 30 in the same direction as the sun gear 34 rotates.

When the lever 60 is in its third position (FIG. 7), The speed of shaft $$D3 = SD3 = SC2 \times \frac{21}{35} = 500 \times \frac{21}{35} = 300 \text{ r.p.m.}$$

Chart 7
R.P.M. POWER LINE STAGE 7 40 H.P.

| Clutch | Lever 60 Pos. | SC2 | SAR | SAE | SE1 | SC1 | SCR | SA=SA1 |
|---|---|---|---|---|---|---|---|---|
| HMQTP | 1 Cros | 0 | 0 | 525 | 350 | 700 | 389 | 2,100 |
| | 2 | 250 | 125 | 618.75 | 412.5 | 700 | 0 | 2,100 |
| | 3 Crds | 500 | 250 | 712.5 | 475 | 700 | 389 | 2,100 |

$SC2 = Cbs + \frac{72}{72+40} \times SCR$, where $Cbs$ = base speed of C planetary.

$SA2 = Abs + \frac{60}{60+20} \times SAR$, where $Abs$ = base speed of A planetary.

$SAR = SC2 \times \frac{28}{56}$ (direction of sun 34); $SE1 = SA2 \times \frac{24}{36}$.

$SC1 = SA \times \frac{21}{63}$; $SCR$ = (column 7).

SHAFT TORQUE, IN./LBS.

| Lever 60 Pos. | TE1 | TA2 | TAR | TA1 | TC2 | TC1 | TCR |
|---|---|---|---|---|---|---|---|
| 1 Cros | 7,200 | 4,800 | 3,600 | 1,200 | 1,800 | 643 | 1,160 |
| 2 | 6,120 | 4,080 | 3,055 | 1,025 | 1,528 | 546 | 982 |
| 3 Crds | 5,320 | 3,550 | 2,660 | 890 | 1,330 | 475 | 855 |

$TC2 = TAR \times \frac{28}{56}$ $TE1 = \frac{40 \times 63,000}{SE1}$ $TA2 = TE1 \times \frac{24}{36} \times TC2 = TAR \times \frac{21}{35} \times \frac{28}{56}$ $\left.\begin{array}{l}TAR = TA2 \times \frac{3}{4} \\ TA1 = TA2 \times \frac{1}{4}\end{array}\right\}$ similar to derivation for reactor D (column 12) $\left\{\begin{array}{l}TC1 = TC2 \times \frac{2.5}{7} \\ TCR = TC2 \times \frac{4.5}{7}\end{array}\right.$

SHAFT HORSEPOWER  H.P. = $\frac{T \times R.P.M.}{63,000}$

| | Lever 60 Pos. | PE1 | PA2 | PC2=PAR | PA1 | PC2 | PC1 | PCR | PA=PA1+PAR (AR=direction sun 34) |
|---|---|---|---|---|---|---|---|---|---|
| 1 | Cros 1 | 40 | 40 | 0 | 40 | PC1−PCR  0 | 7.15 | 7.15 | 40 |
| 2 | 2 | 40 | 40 | 6.1 | 34.2 | PC1  6.1 | 6.1 | 0 | 40 |
| 3 | Crds 3 | 40 | 40 | 10.5 | 29.8 | PC1+PCR  10.5 | 5.2 | 5.2 | 40 |

Referring to Chart 7, movement of lever 60 from its number 1 position to its number 3 position causes the shaft E1 to rotate from 350 r.p.m. to 475 r.p.m., and the power in shaft E1 remains 40 H.P. The power at E1, of course, is made up of the combination of power at A1 and AR, which latter is made up from the algebraic sum of the power at C1 and CR and transmitted to the A reactor 30 through gears 37 and 29.

The speed of shaft D2 when lever 60 is in its third position (FIG. 7) is:

$SD2 = Dbs - Rso = 300$ (column 7)

Accordingly, clutch N can be engaged and clutch M disengaged (FIG. 8).

The power now flows from A1 to E1 through the planetary A, and this power is made up of power from A1 and power from the A reactor 30. The A reactor 30 is still being driven in the same direction as it was during phase 7, namely, in the same direction as sun gear 34 but from the D planetary through the gear train 26, 25, 37 and 29.

It is to be understood that the H clutch was engaged and the L clutch disengaged at stage 7. However, it has been ineffective at the output shaft E1 since clutch U

*Chart 8*

R.P.M. POWER LINE STAGE 8 40 H.P.

| Clutch | Lever 60 Pos. | SA2 | SC3 | SAR | SD2 | SE1 | SA=SA1 | SD1 | SDR |
|---|---|---|---|---|---|---|---|---|---|
| HNQTP | 1 Dros | 712.5 | 500 | 250 | 300 | 475 | 2,100 | 1,260 | 233.3 |
|  | 2 | 806 | 750 | 375 | 450 | 537.5 | 2,100 | 1,260 | 0 |
|  | 3 Drds | 900 | 1,000 | 500 | 600 | 600 | 2,100 | 1,260 | 233.3 |

$SD2 = Dbs + \frac{72}{72+40} \times SDR$, where $Dbs$ = base speed of D planetary.

$SA2 = Abs + \frac{60}{60+20} \times SAR$, where $Abs$ = base speed of A planetary.

$SC3 = SD2 \times \frac{35}{21}$; $SAR = SC3 \times \frac{28}{56}$ (direction of sun 34).

$SE1 = SA2 \times \frac{24}{36}$; $SD1 = SA \times \frac{21}{63} \times \frac{72}{40}$; $SDR$ = (column 6).

SHAFT TORQUE, IN./LBS.

| Lever 60 Pos. | TE1 | TA2 | TAR | TA1 | TD2 | TD1 | TDR |
|---|---|---|---|---|---|---|---|
| 1 Dros | 5,300 | 3,530 | 2,650 | 885 | 2,210 | 790 | 1,420 |
| 2 | 4,700 | 3,140 | 2,350 | 786 | 1,960 | 700 | 1,260 |
| 3 Drds | 4,200 | 2,800 | 2,100 | 700 | 1,750 | 625 | 1,125 |

$TE1 = \frac{40 \times 63,000}{SE1}$ $TA2 = TE1 \times \frac{24}{36}$; $TD2 = TAR \times \frac{28}{56} \times \frac{35}{21}$.

$TAR = TA2 \times \frac{3}{4}$
$TA1 = TA2 \times \frac{1}{4}$ } similar to derivation for D reactor (column 12).

$TD1 = TD2 \times \frac{2.5}{7}$ (column 12)
$TDR = TD2 \times \frac{4.5}{7}$ (column 12)

SHAFT HORSEPOWER  H.P. = $\frac{T \times R.P.M.}{63,000}$

| Unit 56 | Lever 60 Pos. | PE1 | PA2 | PD2=PAR | PA1 | PD2 | PD1 | PDR | PA=PA1+PAR (AR direction sun 34) |
|---|---|---|---|---|---|---|---|---|---|
| 3 | Drds 1 | 40 | 40 | 10.5 | 29.5 | PD1−PDR 10.5 | 15.9 | 5.3 | 40 |
| 2 | 2 | 40 | 40 | 14 | 26 | PD1 14 | 14 | 0 | 40 |
| 1 | Dros 3 | 40 | 40 | 16.7 | 23.3 | PD1+PDR 16.7 | 12.5 | 4.2 | 40 |

Referring to Chart 8, movement of the lever 60 from its number 1 to its number 3 position causes the speed of shaft E1 to increase from 475 to 600 r.p.m. The power at E1 remains at a constant 40 H.P. It is made up of the algebraic sum of the power in A1 and AR. The latter, of course, is made up of the power in D1 and DR. It is to be noted that since the D reactor in the number 1 position of lever 60 (Chart 8 and FIG. 8) rotates oppositely to the rotation of the sun gear 15, its power subtracts from that in D1 in making up the power at AR; and, when lever 60 is in its number 3 position, the D reactor rotates in the same direction as the sun gear 15 which causes the power at DR to add to the power at D1 to make up the power at AR.

When lever 60 is in its number 3 position (FIG. 8),

The speed of the B2 shaft = $SB2 = Bbs + \frac{60}{60+20} \times (SBR)$ has been disengaged. The speed of B1 with clutch H engaged is:

$$SB1 = 2100 \times \frac{21}{63} \times \frac{63}{21} = 2100 \text{ r.p.m.}$$

Accordingly, the base speed of the B reactor at 2100 r.p.m. for $B1 = B_{21}bs = 525$ r.p.m. (column 9)

$SB2 = B_{21}bs − B_{21}so = 300$ r.p.m.

and opposite to sun 45 (driven by D3 through 28 and 40).

When lever 60 is in its number 3 position (FIG. 8), $SE1 = 600$ r.p.m.

The speed of gear 46 = $600 \times \frac{19}{38} = 300$ r.p.m.

Accordingly, clutch U can be engaged and clutch Q can be disengaged.

Chart 9

R.P.M. POWER LINE STAGE 9  40 H.P.

| Clutch | Lever 60 Pos. | SD2 | SBR | SB2 | SE1 | SD1 | SB1 | SDR |
|---|---|---|---|---|---|---|---|---|
| HNPUQ | 1 Drds | 600 | 300 | 300 | 600 | 1,260 | 2,100 | 233.3 |
| | 2 | 450 | 225 | 356.25 | 712.5 | 1,260 | 2,100 | 0 |
| | 3 Dros | 300 | 150 | 412.5 | 825 | 1,260 | 2,100 | 233.3 |

$SD2 = Dbs + \frac{72}{72+40} \times SDR$; where $Dbs$ = base speed of D planetary.

$SB2 = Bbs + \frac{60}{60+20} \times SBR$; where $Bbs$ = base speed of B planetary.

$SBR = SD2 \times \frac{28}{56}$ (opposite sun 45); $SE1 = SB2 \times \frac{38}{19}$ $SD1 = SA \times \frac{21}{63} \times \frac{72}{40}$; $SB1 = SA \times \frac{21}{63} \times \frac{63}{21}$; $SDR$ = (column 6).

SHAFT TORQUE, IN./LBS.

| Lever 60 Pos. | TE1 | TB2 | TBR | TB1 | TD2 | TD1 | TDR |
|---|---|---|---|---|---|---|---|
| 1 Drds | 4,200 | 8,400 | 6,300 | 2,100 | 3,150 | 1,125 | 2,025 |
| 2 | 3,540 | 7,080 | 5,320 | 1,760 | 2,660 | 950 | 1,710 |
| 3 Dros | 3,050 | 6,100 | 4,580 | 1,520 | 2,290 | 815 | 1,475 |

$TE1 = \frac{40 \times 63{,}000}{SE1}$; $TB2 = TE1 \times \frac{38}{19}$; $TD2 = TBR \times \frac{28}{56}$.

$TBR = \frac{3}{4} TB2$ (column 11); $TB1 = \frac{1}{4} TB2$ (column 11).

$TD1 = TD2 \times \frac{2.5}{7}$ (column 12); $TDR = TD2 \times \frac{4.5}{7}$ (column 12).

SHAFT HORSEPOWER  H.P. = $\frac{T \times R.P.M.}{63{,}000}$

| Unit 56 | Lever 60 Pos. | PE1 | PB2 | PD2=PBR | PB1 | PD2 | PD1 | PDR | PA=PB1−PBR (BR opposite sun 45) |
|---|---|---|---|---|---|---|---|---|---|
| 1 | Drds 1 | 40 | 40 | 30 | 70 | PD1+PDR 30 | 22.5 | 7.5 | 40 |
| 2 | 2 | 40 | 40 | 19.1 | 59 | PD1 19 | 19 | 0 | 40 |
| 3 | Dros 3 | 40 | 40 | 10.9 | 50.8 | PD1−PDR 10.9 | 16.3 | 5.5 | 40 |

Referring to Chart 9, movement of the lever 60 from its number 1 to its number 3 position causes the speed of shaft E1 to increase from 600 r.p.m. to 825 r.p.m., while the power in shaft E1 remains at 40 H.P.

Referring to FIG. 9, power now flows to shaft E1 through the B planetary and is the algebraic sum of the power in shaft B1 and BR, and the latter is the algebraic sum of the power in D1 and DR.

Although there is circulating power in B1 equal to 70 H.P. (Chart 9) when lever 60 is in its number 1 position, the B reactor 41 rotates oppositely to sun gear 45 so that the power at BR subtracts from the circulating power in B1. This power at BR is the algebraic sum of the power in D1 and DR, and is transmitted to the B reactor 41 through the gear train 28 and 40. Referring to Chart 9, the D1 power = 22.5 H.P. and the DR power = 7.5 H.P. Since the D reactor rotates in the same direction as the sun gear 15 when the lever 60 is in its position 1 (FIG. 9), the power of $BR = 22.5 + 7.5 = 30$ H.P.

Therefore, total power at $E1 = 70 - 30 = 40$ H.P., when the lever 60 is in its number 1 position (FIG. 9).

When lever 60 is in its number 3 position (FIG. 9), the speed of shaft = $SC2 = Cbs + Csd = 500$ r.p.m. (column 7).

The speed of gear 25 when lever 60 is in its number 3 position (Fig. 9) = $SD2 \times \frac{35}{21} = 300 \times \frac{35}{21}$ $SD2 = 500$ r.p.m.

Figure 10:
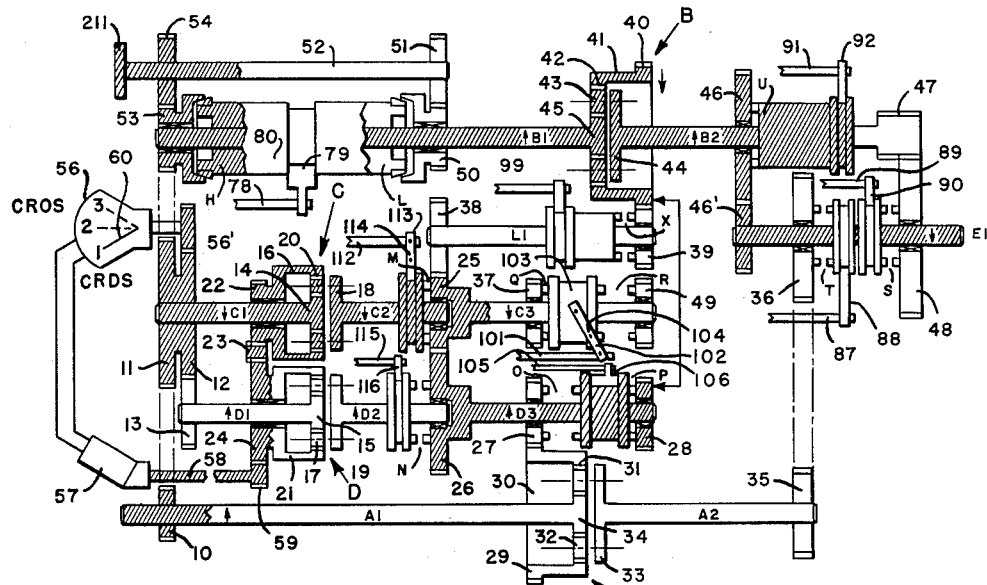

Accordingly, clutch M can be engaged and clutch N disengaged.

of the power at C1 and CR. When lever 60 is in its number 1 position (FIG. 10), the C reactor rotates in the

Chart 10

R.P.M. POWER LINE STAGE 10 40 H.P.

| Clutch | Lever 60 Pos. | SC2 | SD3 | SBR | SB2 | SE1 | SB1 | SC1 | SCR |
|---|---|---|---|---|---|---|---|---|---|
| HMPUQ | 1 Crds | 500 | 300 | 150 | 412.5 | 825 | 2,100 | 700 | 388.9 |
|  | 2 | 250 | 150 | 75 | 468.5 | 937.5 | 2,100 | 700 | 0 |
|  | 3 Cros | 0 | 0 | 0 | 525 | 1,050 | 2,100 | 700 | 388.9 |

$SB2 = Bbs + \frac{60}{60+20} \times SBR$, where $Bbs$=base speed of B planetary.

$SC2 = Cbs + \frac{72}{72+40} \times SCR$, where $Cbs$=base speed of C planetary.

$SD3 = SC2 \times \frac{21}{35}$; $SBR = SD3 \times \frac{28}{56}$ (opposite sun 45); $SE1 = SB2 \times \frac{38}{19}$.

$SB1 = SA \times \frac{21}{63} \times \frac{63}{21}$; $SC1 = SA \times \frac{21}{63}$; $SCR$=(column 7).

SHAFT TORQUE, IN./LBS.

| Lever 60 Pos. | TE1 | TB2 | TBR | TB1 | TC2 | TC1 | TCR |
|---|---|---|---|---|---|---|---|
| 1 Crds | 3,050 | 6,100 | 4,580 | 1,520 | 1,370 | 490 | 880 |
| 2 | 2,690 | 5,380 | 4,050 | 1,340 | 1,215 | 434 | 780 |
| 3 Cros | 2,390 | 4,780 | 3,600 | 1,190 | 1,080 | 386 | 693 |

$TE1 = \frac{40 \times 63,000}{SE1}$; $TB2 = TE1 \times \frac{38}{19}$; $TBR = \frac{3}{4} TB2$ (column 11).

$TB1 = \frac{1}{4} TB2$ (column 11); $TC2 = TBR \times \frac{28}{56} \times \frac{21}{35}$.

$TC1 = TC2 \times \frac{2.5}{7}$; $TCR = TC2 \times \frac{4.5}{7}$ (column 16).

SHAFT HORSEPOWER  $H.P. = \frac{T \times R.P.M.}{63,000}$

| Unit 56 | Lever 60 Pos. | PE1 | PB2 | PC2= PBR | PB1 | PC2 | PC1 | PCR | PA= PB1−PBR (BR opposite sun 45) |
|---|---|---|---|---|---|---|---|---|---|
| 3 | Cros 1 | 40 | 40 | 10.9 | 50.7 | PC1+PCR 10.9 | 5.43 | 5.43 | 40 |
| 2 | 2 | 40 | 40 | 4.8 | 45.7 | PC1 4.93 | 4.80 | 0 | 40 |
| 1 | Crds 3 | 40 | 40 | 0 | 40 | PC1−PCR 0 | 4.28 | 4.28 | 40 |

From an inspection of Chart 10 it is evident that in moving lever 60 from its number 1 to its number 3 position, the speed of shaft E1 increases from 825 r.p.m. to 1050 r.p.m.

The power now flows to shaft E1 through the B planetary but BR is influenced by the C planetary instead of by the D planetary, as was the case in stage 9. In this case, the algebraic sum of the power at C planetary is transmitted to the B reactor 41 through the gear train 25, 26, 28 and 40. This power from the C planetary is made up of the power at C1 and CR. When lever 60 is in its number 1 position (FIG. 10), the C reactor rotates in the same direction as the sun gear 14 and its power adds to that of C1. However, this sum subtracts from the power at B1 since the B reactor 41 rotates oppositely to the sun gear 45. When lever 60 is in its number 3 position (FIG. 10), the C reactor rotates oppositely to the sun gear 14 and hence its power subtracts from that of shaft C1, and this difference is subtracted from the power in shaft B1 in going to the output shaft E1.

When lever 60 is in its number 3 position in stage 10 (Chart 10), the speed of shaft C3 and clutch R=SC2=0;

and, the speed of the B reactor 41=0. Therefore, clutch R can be engaged and clutch P can be disengaged.

the C reactor rotates oppositely to sun gear 14 and hence its power subtracts from the C1 power and the difference

*Chart 11*

R.P.M. POWER LINE STAGE 11 40 H.P.

| Clutch | Lever 60 Pos. | SC2 | SBR | SB2 | SE1 | SB1 | SC1 | SCR |
|---|---|---|---|---|---|---|---|---|
| HMRUO | 1 Cros | 0 | 0 | 525 | 1,050 | 2,100 | 700 | 388.9 |
| | 2 | 250 | 125 | 618.75 | 1,237.5 | 2,100 | 700 | 0 |
| | 3 Crds | 500 | 250 | 712.5 | 1,425 | 2,100 | 700 | 388.9 |

$SB2 = Bbs + \frac{60}{60+20} \times SBR$, where $Bbs$=base speed of B planetary.

$SC2 = Cbs + \frac{72}{72+40} \times SCR$, where $Cbs$=base speed of C planetary.

$SBR = SC2 \times \frac{28}{56}$ (direction of sun 45); $SE1 = SB2 \times \frac{38}{19}$.

$SB1 = SA \times \frac{21}{63} \times \frac{63}{21}$; $SC1 = SA \times \frac{21}{63}$; $SCR$=(column 7).

SHAFT TORQUE, IN./LBS.

| Lever 60 Pos. | TE1 | TB2 | TBR | TB1 | TC2 | TC1 | TCR |
|---|---|---|---|---|---|---|---|
| 1 Cros | 2,390 | 4,780 | 3,580 | 1,200 | 1,780 | 640 | 1,150 |
| 2 | 2,030 | 4,060 | 3,040 | 1,020 | 1,520 | 542 | 978 |
| 3 Crds | 1,765 | 3,530 | 2,650 | 880 | 1,325 | 472 | 853 |

$TE1 = \frac{40 \times 63,000}{SE1}$; $TB2 = TE1 \times \frac{38}{19}$; $TBR = \frac{3}{4} TB2$ (column 11).

$TB1 = \frac{1}{4} TB2$ (column 11); $TC2 = TBR \times \frac{28}{56}$.

$TC1 = TC2 \times \frac{2.5}{7}$; $TCR = TC2 \times \frac{4.5}{7}$ (column 16).

SHAFT HORSEPOWER $H.P. = \frac{T \times R.P.M.}{63,000}$

| Unit 56 | Lever 60 Pos. | PE1 | PB2 | PBR | PB1 | PC2 | PC1 | PCR | PA=PB1+PBR (BR direction sun 45) |
|---|---|---|---|---|---|---|---|---|---|
| 1 | Cros 1 | 40 | 40 | 0 | 40 | PC1−PCR 0 | 7.1 | 7.1 | 40 |
| | 2 | 40 | 40 | 6.05 | 34 | PC1 6.05 | 6.05 | 0 | 40 |
| 3 | Crds 3 | 40 | 40 | 10.5 | 29.6 | PC1+PCR 10.5 | 5.2 | 5.2 | 40 |

From an inspection of Chart 11 it is evident that the speed of shaft E1 increases from 1050 r.p.m. to 1425 r.p.m. The power still remains at 40 H.P. and flows to shaft E1 through the B planetary, but the power in B reactor 41 is made up of the algebraic sum of the power in shaft C1 and CR which is transmitted to the B reactor 41 through the gear train 49 and 40. This gear train reverses the direction of rotation of the B reactor 41 from that of stage 10 so that it now rotates in the same direction as the sun gear 45.

Figure 11:
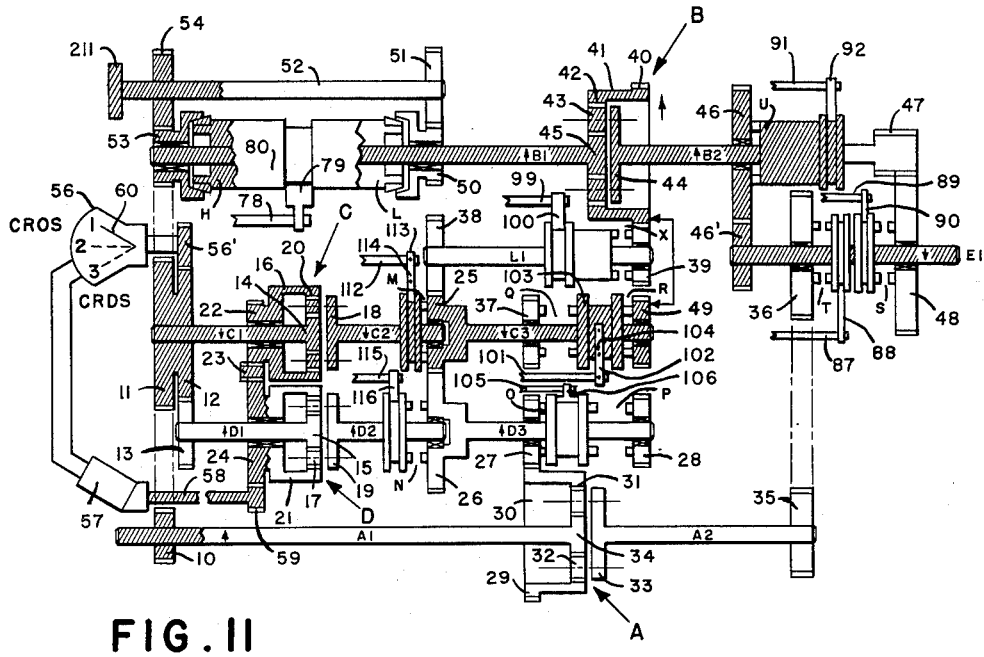

When lever 60 is in its number 1 position (FIG. 11), is now added to the power at B1 since the B reactor 41 is now rotating in the same direction as the sun gear 45.

In position 3 of lever 60 (FIG. 11), the C reactor rotates in the same direction as the sun gear 14 and hence its power adds to that of C1 and the sum is added to that of B1 in going to shaft E1.

When lever 60 is in its number 3 position (FIG. 11), the speed of shaft $D2 = SD2 = Dbs - Dso = 300$ r.p.m. column 7.

The speed of gear $26 = SC2 \times \frac{21}{35} = 500 \times \frac{21}{35} = 300$ r.p.m Accordingly, clutch N can be engaged and clutch M disengaged.

From the foregoing it is evident that as shaft E1 rotates from 0 to 1800 r.p.m., a specific sequential order of clutch shifting is required at specific speeds of the shaft E1. Thus:

Chart 12

R.P.M. POWER LINE STAGE 12 40 H.P.

| Clutch | Lever 60 Pos. | SD2 | SL1 | SBR | SB2 | SE1 | SB1 | SD1 | SDR |
|---|---|---|---|---|---|---|---|---|---|
| HNRUO | 1 Dros | 300 | 500 | 250 | 712.5 | 1,425 | 2,100 | 1,260 | 233.3 |
| | 2 | 450 | 750 | 375 | 806.25 | 1,612 | 2,100 | 1,260 | 0 |
| | 3 Drds | 600 | 1,000 | 500 | 900 | 1,800 | 2,100 | 1,260 | 233.3 |

$SD2 = Dbs + \frac{72}{72+40} \times SDR$, where $Dbs$ = base speed of D planetary.

$SB2 = Bbs + \frac{60}{60+20} \times SBR$, where $Bbs$ = base speed of B planetary.

$SL1 = SC3 = SD2 \times \frac{35}{21}$; $SBR = SC3 \times \frac{28}{56}$ (direction of sun 45).

$SE1 = SB2 \times \frac{38}{19}$; $SB1 = SA \times \frac{21}{63} \times \frac{63}{21}$; $SD1 = SA \times \frac{21}{63} \times \frac{72}{40}$.

$SDR$ = (column 6).

SHAFT TORQUE, IN./LBS.

| Lever 60 Pos. | TE1 | TB2 | TBR | TD2 | TD2 | TD1 | TDR |
|---|---|---|---|---|---|---|---|
| 1 Dros | 1,765 | 3,530 | 2,650 | 880 | 2,210 | 790 | 1,420 |
| 2 | 1,560 | 3,120 | 2,340 | 780 | 1,940 | 690 | 1,250 |
| 3 Drds | 1,400 | 2,800 | 2,100 | 700 | 1,745 | 622 | 1,123 |

$TE1 = \frac{40 \times 63,000}{SE1}$; $TB2 = TE1 \times \frac{38}{19}$; $TBR = \frac{3}{4} TB2$ (columb 11).

$TB1 = \frac{1}{4} TB2$ (column 11); $TD2 = TBR \times \frac{28}{56} \times \frac{35}{21}$.

$TD1 = TD2 \times \frac{2.5}{7}$ (column 12); $TDR = TD2 \times \frac{4.5}{7}$ (column 12).

SHAFT HORSEPOWER $H.P. = \frac{T \times R.P.M.}{63,000}$

| Unit 56 | Lever 60 Pos. | PE1 | PB2 | PBR | PB1 | PD2 | PD1 | PDR | PA = PB1+PBR (BR direction of sun 45) |
|---|---|---|---|---|---|---|---|---|---|
| 3 | Drds 1 | 40 | 40 | 10.5 | 29.4 | PD1−PDR 10.5 | 15.7 | 5.2 | 40 |
| 2 | 2 | 40 | 40 | 13.9 | 26.1 | PD1 13.9 | 13.9 | 0 | 40 |
| 1 | Dros 3 | 40 | 40 | 16.7 | 23.3 | PD1+PDR 16.7 | 12.4 | 4.2 | 40 |

From an inspection of Chart 12, it is evident that the speed of shaft E1 increases from 1425 r.p.m. to 1800 r.p.m., and the power in shaft E1 remains at 40 hp. The power still flows to the shaft E1 through the B planetary, but the power at the B reactor is made up from the algebraic sum of the power at shaft D1 and DR which sum is transmitted to the B reactor 41 through the gear trains 26, 25, 49 and 40.

With lever 60 in its number 1 position (FIG. 12), the D reactor is rotating oppositely to sun gear 15 and, therefore, its power subtracts from that of D1, and the difference is added to that of shaft B1 in going to shaft E1 since the B reactor 41 is still rotating in the same direction as the sun gear 45.

When lever 60 is in its number 3 position (FIG. 12), the D reactor rotates in the same direction as sun gear 15, hence its power adds to that of D1 and the sum is added to the power of shaft B1 in going to shaft E1.

| Stage | Clutches Shifted | Speed of Shaft E1 | Arrangement |
|---|---|---|---|
| 1 | M in–N out | 0 | LNXSQ |
| 2 | M in–N out | 50 | LMXSQ |
| 3 | R in–X out / O in–Q out | 100 | LMRSO |
| 4 | N in–M out | 150 | LNRSO |
| 5 | T in–S out | 200 | LNRTO |
| 6 | M in–N out | 275 | LMRTO |
| 7 | H in–L out / Q in–R out / P in–O out | 350 | HMQTP |
| 8 | N in–M out | 475 | HNQTP |
| 9 | U in–T out | 600 | HNQUP |
| 10 | M in–N out | 825 | HMQUP |
| 11 | R in–P out / O in–Q out | 1,050 | HMOUR |
| 12 | N in–M out | 1,425 | HNOUR |

From the foregoing it is evident that the various clutches are required to be shifted in a predetermined pattern in order to vary the speed of the output shaft E1. Referring to FIG. 13, this may be accomplished by providing a plurality of cams 61, 62, 63 and 64 fixed to a shaft 65. The shaft 65 is adapted to be turned in a clockwise and a counterclockwise direction to produce acceleration and deceleration, respectively, by means to be described later.

Valves 66, 67, 68 and 69 may be associated with cams 61 and 64, respectively. The valves 66 to 69 may be separately supplied with liquid under pressure from a supply line 70 through lines 71, 72, 73 and 74, respectively. Valve 66 may be connected to a cylinder 75 by a line 76, the liquid within which acts on the side of a piston 77 having the largest area, while constant pressure liquid from line 72 acts on the side of piston 77 having the smallest area. The piston 77 has a piston rod 78 and a finger 79 adapted to cooperate with a collar 80 (FIG. 1) for shifting clutches "H" and "L" into and out of effective positions.

The valve 67 may be connected to cylinders 81, 82 and 83 by a line 67' in a manner to act on the larger effective areas of pistons 84, 85 and 86 therein. The smaller effective areas of pistons 84, 85 and 86 are connected to the supply line 70 through branch 72.

The piston 84 may include a piston rod 87 that includes a finger 88 that engages the clutch "T" (FIG. 1); piston 85 may include a piston rod 89 having a finger 90 that engages clutch "S" (FIG. 1); and piston 86 may include a piston rod 91 having a finger 92 that engages clutch "U" (FIG. 1).

The valve 68 may be connected to cylinders 93, 94 and 95 by a line 68' in a manner to act on the larger effective areas of pistons 96, 97 and 98 therein. Piston 96 includes a rod 99 having a finger 100 that engages clutch "X" (FIG. 1); piston 97 has a rod 101 including a finger 102 that engages a common clutch element 103 for clutches "Q" and "R" and is pivoted at 104 (FIG. 1); and piston 98 includes a rod 105 having a finger 106 that engages a common clutch element 107 for clutches "O" and "P" (FIG. 1).

Valve 69 may be connected to cylinders 108 and 109 by a line 69' in a manner to act on the larger effective areas of pistons 110 and 111 therein. The piston 110 includes a rod 112 having a finger 113 pivoted at 114 for engaging clutch "M"; and piston 111 includes a rod 115 having a finger 116 that engages clutch "N."

All of the sides of pistons 84, 85, 86 having the smaller effective areas are supplied with pressure liquid from the supply line 70 through line 72. All of the sides of pistons 96, 97 and 98 having the smaller effective areas are supplied also from line 70 through line 73; and the sides of pistons 110 and 111 having the smaller effective areas are supplied with pressure fluid from supply line 70 through line 74.

In order to ensure the proper shifting of the various clutches, interlocking means may be employed. Referring to FIGS. 14, 15 and 16, hydraulically actuated interlocking devices 117, 118 and 119 are shown. Referring to FIG. 14, a housing 120 includes a reciprocable shuttle 121 having protuberances 122, 123, 123', 124 and 125 thereon. The shuttle 121 is continuously urged upwardly by fluid pressure from lines 70, 74 and 126. The opposite end 127 of shuttle 121 may be connected to tank through passage 128 and valve 129. The rods 87, 89 and 91 may be connected to separate continuations, each having passages 130, 131 and 132 therethrough for the passage of the protuberances 122 to 125 under certain conditions to be explained later. The continuations of rods 87, 89 and 91 are connected to pistons 84, 85 and 86.

Referring to FIG. 15, a housing 133 includes a reciprocable shuttle 134 having protuberances 135, 136, 137, 138, 139, 140, 141, 142 and 143. The shuttle 134 is continuously urged upwardly by fluid under pressure from lines 74 and 144. The opposite end 145 of shuttle 134 may be connected to tank through passage 146 and valve 129. The rods 99, 101 and 105 have extensions connected to pistons 96, 97 and 98. These extensions have passages 147, 148 and 149 through which the protuberances 135 to 143 cooperate under circumstances to be explained later.

Referring to FIG. 16, a housing 150 includes a reciprocable shuttle 151 containing protuberances 152 and 153 thereon. The shuttle 151 is continuously urged upwardly by fluid under pressure from lines 74 and 154. The opposite end of shuttle 151 is connected to valve 69 through line 69'. The rods 112 and 115 have connectors between them and pistons 110 and 111. These connectors have passages 155 and 156 which cooperate with protuberances 152 and 153 under certain circumstances as will be explained later.

Figure 19:
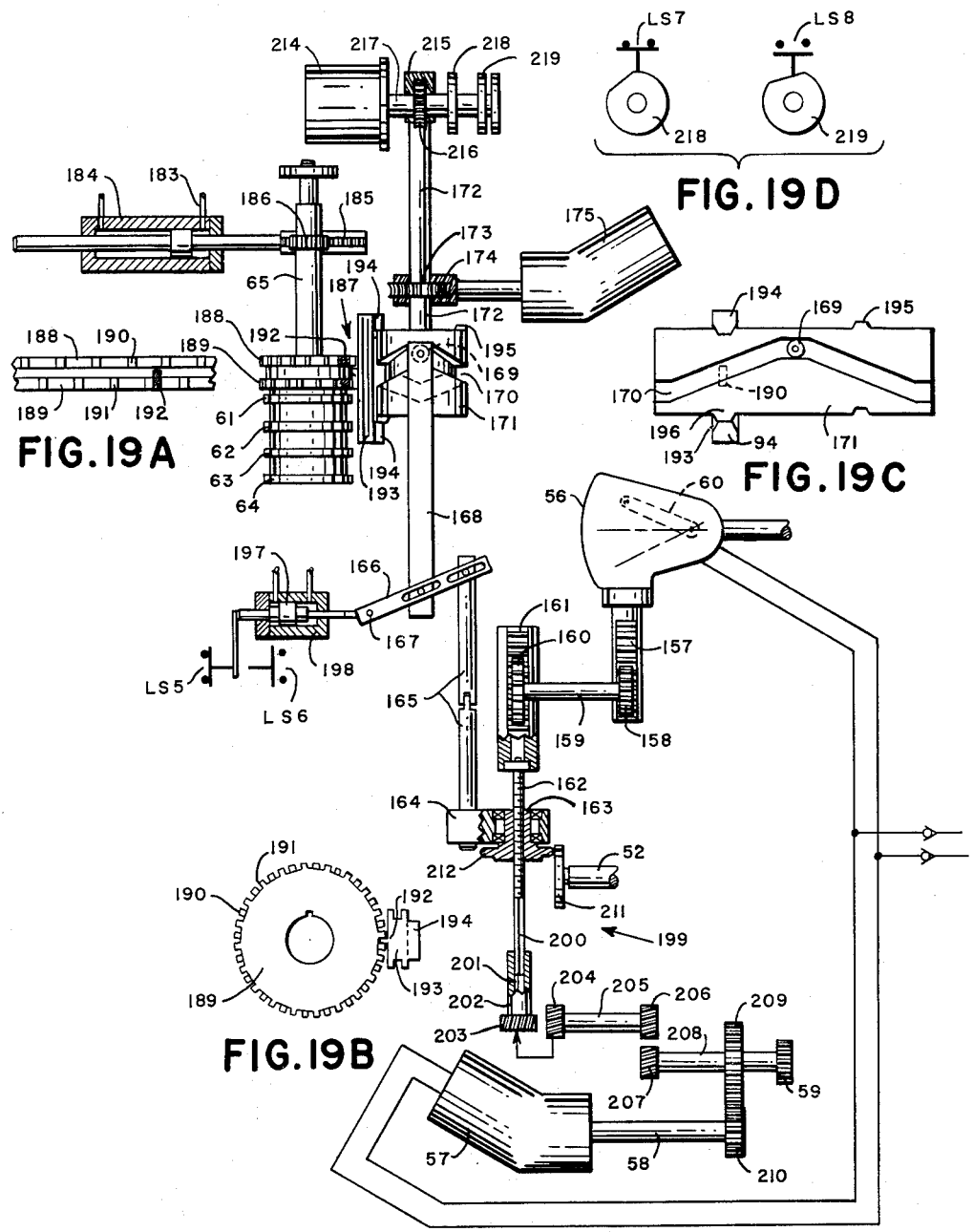
FIG. 19 is a schematic showing of certain of the control equipment.

Since shifting of the various clutches is timed with the cyclic operation of the lever 60 of the hydraulic variable displacement pump 56, a description of the operation of pump 56 will now be given. Referring to FIG. 19, the lever 60 of pump 56 may be connected to a reciprocable rack 157 that meshes with a gear 158 fixed to a shaft 159. Another gear 160 fixed to shaft 159 meshes with another rack 161 that is connected to a threaded shaft 162. The threaded shaft 162 threads into a rotatable nut 163 that is mounted in a bracket 164 fixed to a rod 165 that is pivotally connected to an oscillatable link 166. The link 166 is pivoted to a movable point 167 for a purpose to be described later, and is oscillated by a rod 168 including a cam follower 169 that rides in a cam groove 170 of a barrel cam 171. The cam 171 is fixed to a shaft 172 to which a worm wheel 173 is connected. The worm wheel meshes with a worm 174 that is driven by a constant displacement hydraulic unit 175. The unit 175 may be supplied with fluid under pressure from main supply line 70 (FIG. 13), a line 176, a valve 177, a line 178, a valve 179, line 180 and return line 181 leading to valve 177. A branch 183 supplies fluid under pressure to a cylinder 184 for actuating a rack 185 that meshes with a gear 186 fixed to shaft 65 containing cams 61 to 64.

Since the shifting of clutches within the transmission is effected when the lever 60 is in its upper and lower positions, the cam shaft 65 must be intermittently indexed from one station to the next succeeding station when lever 60 is at its upper and lower positions. In order to accomplish this, an escapement mechanism 187 is provided. It includes two ratchet wheels 188 and 189 fixed together and also fixed to shaft 65. The teeth 190 on ratchet 188 are arranged midway between the space between adjacent teeth 191 on ratchet 189. A finger 192 (FIG. 19A) on a reciprocable member 193 normally lies in partial overlapping relation to teeth 190 and 191 during rotation of cam 171 between positions 1 and 3 of lever 60, but at positions 1 and 3 aligned dogs 194 on member 193 coact with rises 195, 196 on cam 171 to shift member 193 upwardly or downwardly to release one set of the teeth 190, 191, whereupon the piston in cylinder 184 advances cam shaft 65 until the next effective teeth 190, 191 stop such advancement.

In order to prevent tooth-on-tooth interference when shifting the clutches within the transmission, means is provided for preventing the exact synchronization of the clutches at the time shifting takes place.

The upper and lower positions of the lever 60 represent positions at which the various clutches to be shifted at any given stage are at synchronous speeds. It has been found that if the lever 60 is moved to positions slightly less than those represented by 1 and 3 during acceleration, and slightly farther than these positions during deceleration, two functions are performed. In the first place, tooth-on-tooth clutch action is avoided because the mating elements are caused to rotate at slightly different speeds than synchronous speeds. Secondly, the clutch elements to be disengaged are automatically unloaded by the clutch elements that are shifted into engagement.

Referring to FIG. 19, means has been provided for accomplishing these results. It may comprise the pivoted lever 166 which in the position shown provides a shorter stroke to linkage 165 than when a piston 197 within cylinder 198 is moved to its righthand position. This longer stroke moves lever 60 farther than positions 1 and 3, while the shorter stroke moves it less than these positions.

Should some discrepancies occur within the hydraulic system including units 56 and 57 such as wear, causing inefficiency in the system, the nearly synchronized condition of the clutches, which is necessary for clutch shifting, would be disturbed, causing malfunctioning of the control. This has been overcome by providing a compensating means 199 that cooperates with the rack 161 and the relative speeds of the input and output of units 56 and 57. The means 199 may comprise a square end portion 200 of threaded shaft 162 that slidingly is received within a mating passage 201 in a sleeve 202 fixed to a gear 203. The gear 203 meshes with a gear 204 fixed to a shaft 205 to which another gear 206 is fixed and which latter meshes with a gear 207. The gear 207 is fixed to a shaft 208 having a gear 209 fixed thereto that meshes with a gear 210 fixed to the output shaft 58 of unit 57.

Referring to FIGS. 1 and 19, the shaft 52 supports a disk 211 that frictionally engages a disk 212 that is fixed to the threaded nut 163, which latter is journaled in bracket 164. The arrangement and dimensions of the parts are such that should units 56 and 57 operate at rated efficiencies, both the threaded shaft 162 and nut 163 rotate in the same direction at the same speed, so there is no tendency for the shaft 162 to move axially relative to nut 163. However, should the speed of disk 211 vary from what it should be relative to any setting of lever 60, then relative rotation between shaft 162 and nut 163 will occur, thereby adjusting lever 60 to a new position to compensate for the variation of speed of disk 211. This, therefore, automatically compensates for any variations in speed of the synchronizing clutches caused by inefficiencies, variable loads and the like.

In order to better understand the operation of the control system, a description will now be given of a cycle of operation of the transmission during acceleration from the beginning of stage 1 through stage 12. At the beginning of stage 1, clutches "L," "N," "X," "S" and "Q" are engaged and all others are disengaged.

Figure 20:
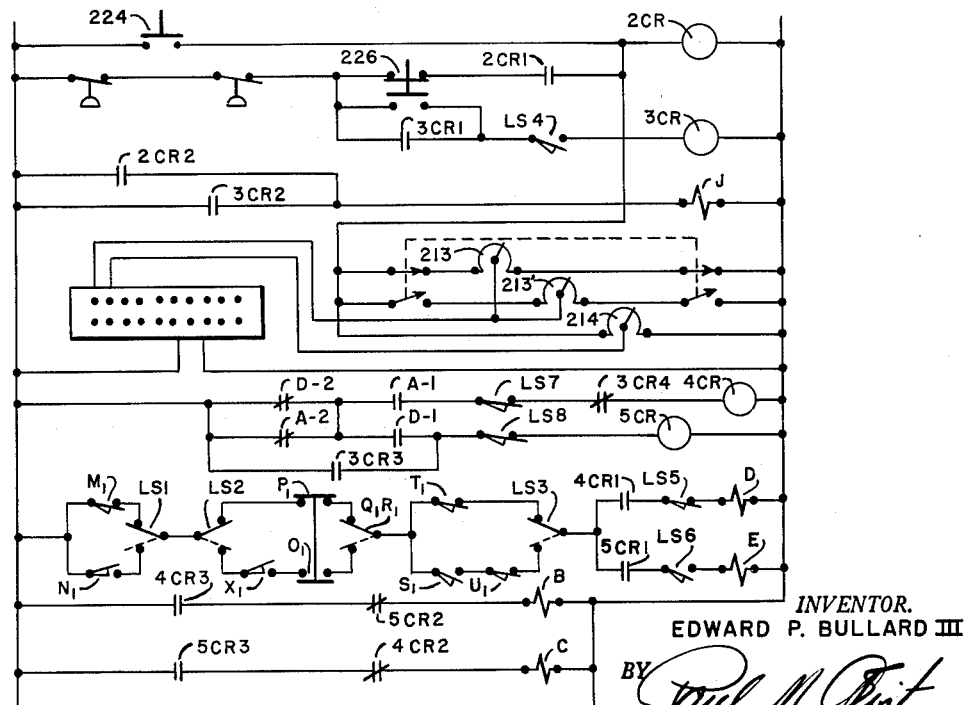
FIG. 20 is an electrical wiring diagram for the control shown in FIGS. 13 and 19.

Referring to FIG. 20, during acceleration, A–1 contacts are closed and A–2 contacts are open by means that will be described later. Accordingly, the 4CR relay is energized closing the 4CR1 contacts. Therefore, with the LS1 contacts in their solid line position, the D solenoid is energized, causing valve 177 to move upwardly so that unit 175 is caused to rotate cam 171. This moves lever 60 to its lower position at which point the output shaft E1 of the transmission is rotating at 50 r.p.m. When lever 60 is at its lower position, stage 1 is completed and a dog 195 or 196 on cam 171 shifts member 193 of the escapement device 187, causing shaft 65 to index so that cam 64 moves valve 69 leftwardly, exhausting line 69' to tank, blocking off liquid from 74 through valve 69, and moving switch LS1 to its dotted line position, which latter de-energizes solenoid D stopping unit 175.

Exhausting line 69' would tend to cause pistons 110 and 111 to move leftwardly except for the interlock 119. This interlock as shown in FIG. 16 permits piston 110 to move leftwardly so that clutch "M" is engaged, after which shuttle 151 moves upwardly to permit piston 111 to move leftwardly. Accordingly, clutch "N" cannot be disengaged until after clutch "M" is engaged. Engagement of clutch "M" opens contacts $M_1$, and disengagement of clutch "N" closes contacts $N_1$. Closing contacts $N_1$ re-energizes solenoid D (FIG. 20), thereby starting unit 175 and rotating cam 171, thereby returning lever 60 to its upper position. When lever 60 reaches its upper position with clutch "M" engaged, the speed of shaft E1 is 100 r.p.m.; stage 2 has been completed; and a dog 195, 196 on cam 171 shifts member 193 to permit escapement 187 to advance cam shaft 65 to its next indexed position. At this point, clutch "R" goes in; clutch "X" comes out; clutch "O" goes in; clutch "Q" comes out; and clutch "M" remains engaged. In other words, valve 69 remains in its left position and valve 68 moves leftwardly. Movement of valve 68 leftwardly exhausts line 68' to tank and moves contacts LS2 to the dotted line position, thereby stopping unit 175. Exhausting line 68' extends to cause pistons 96, 97 and 98 to move leftwardly except that the interlock 118 prevents the motion of pistons 96 and 98.

Referring to FIG. 15, piston 97 is the only one capable of moving leftwardly, and it effects the engagement of clutch "R," moving contacts $Q_1$, $R_1$ to the dotted line position (FIG. 20). Movement of piston 97 leftwardly permits shuttle 134 to move downwardly until protuberance 135 engages the connector for link 99. This permits piston 96 to move leftwardly to effect disengagement of clutch "X" and closing of contacts $X_1$ (see also FIG. 20). Prior to the downward movement of shuttle 134, protuberance 143 held clutches "O" and "P" in neutral. Upon downward movement of shuttle 134, piston 98 moves leftwardly, effecting engagement of clutch "O," the opening of contacts $P_1$ and closing of contacts $O_1$.

This causes current to flow (FIG. 20) through switches $N_1$; LS1 (dotted); LS2 (dotted); $X_1$; $O_1$; $Q_1R_1$ (dotted); $T_1$; LS3; 4CR1; LS5; and solenoid D, energizing the latter. Energizing solenoid D restarts unit 175 and rotates cam 171, causing lever 60 to move to its lower position when shaft E1 is rotating at 150 r.p.m. and stage 3 is completed. When lever 60 is at its lower position at the beginning of stage 4, a dog 195 or 196 on cam 171 shifts member 193, causing escapement 187 to index cam shaft 65 to its next position. In this next position of shaft 65, valve 69 moves rightwardly, causing pressure liquid to act on pistons 110, 111, and causing switch LS1 to move to its solid line position, stopping unit 175. The piston 111 is the only one that can move rightwardly since the protuberance 152 is within passage 155 holding piston 110 in its lefthand position. After piston 111 moves rightwardly, engaging clutch "N" and opening contacts $N_1$, protuberance 153 is aligned with passage 156 permitting shuttle 151 to descend, whereupon piston 110 moves rightwardly, disengaging clutch "M" and closing contacts $M_1$. Current then flows through switches $M_1$; LS1 (solid); LS2 (dotted); $X_1$; $O_1$; $Q_1R_1$ (dotted); $T_1$; LS3; 4CR1; LS5; and D solenoid, energizing the latter.

Energizing D solenoid causes unit 175 to start again, thereby rotating cam 171 causing lever 60 to move to its upper position when shaft E1 is rotating at 200 r.p.m. and stage 4 has been completed. When lever 60 is at its upper position, one of the dogs 195, 196 shifts member 193, causing escapement 187 to index shaft 65, whereupon valve 67 moves leftwardly moving switch LS3 to its dotted line position, stopping unit 175 and exhausting line 67' by connecting it to tank. Exhausting line 67' would cause pistons 84 and 85 to move leftwardly and piston 86 to move rightwardly except for the interlock 117. Referring to FIG. 14, piston 84 is the only one that can move and it moves leftwardly, causing clutch "T" to become engaged and opening switch $T_1$. This permits shuttle 121 to move downwardly, whereupon piston 85 moves leftwardly, disengaging clutch "S" and closing contacts $S_1$. Piston 86 is restrained from movement because of the length of protuberance 125 on shuttle 121 (FIG. 14). Current will now flow through switches $M_1$; LS1 (solid); LS2 (dotted); $X_1$; $O_1$; $Q_1R_1$ (dotted); $S_1$; $U_1$; LS3 (dotted); 4CR1; LS5; and D solenoid, energizing the latter. Energizing solenoid D re-energizes unit 175, rotating cam 171, thereby moving lever 60 to its lower position at which point stage 5 is completed and shaft E1 is rotating at 275 r.p.m.

When lever 60 is in its lower position, escapement 187 again indexes shaft 65 so that cam 64 moves valve 69 leftwardly, moving switch LS1 to its dotted line position, stopping unit 175, and exhausting line 69' which causes clutch "N" to become disengaged, closing contacts $N_1$ and subsequently causing clutch "M" to become engaged and opening contacts $M_1$. Current now flows through switches $N_1$; LS1 (dotted); LS2 (dotted); $X_1$; $O_1$; $Q_1R_1$ (dotted); $S_1$; $U_1$; LS3 (dotted); 4CR1; LS5; and D solenoid, energizing the latter, thereby starting unit 175 and rotating cam 171, moving lever 60 to its upper position when the speed of shaft E1 is 350 r.p.m. and the end of stage 6 is completed. When lever 60 is at its upper position, the escapment 187 indexes shaft 65 to its next position where cam 61 moves valve 66 leftwardly closing switch LS4, and cam 63 permits valve 68 to move rightwardly, moving switch LS2 to its solid line position, stopping unit 175. Movement of valve 66 leftwardly exhausts line 76; hence piston 77 moves leftwardly so that clutch "L" is disengaged and clutch "H" is engaged. Rightward movement of valve 68 causes pressure fluid in line 68' to act on pistons 96, 97 and 98, tending to move them rightwardly, except that interlock 118 prevents movement of pistons 96 and 98 but permits rightward movement of piston 97 (FIG. 15A), thereby engaging clutch "Q", disengaging clutch "R" and moving switch $Q_1R_1$ to its solid line position. Rightward movement of piston 97 permits shuttle 134 to move downwardly until protuberance 140 engages the connector attached to piston 98, at which time piston 98 is permitted to move rightwardly, engaging clutch "P," disengaging clutch "O," closing contacts $P_1$ and opening contacts $O_1$. Thereafter shuttle 134 moves downwardly until protuberance 137 engages the connector attached to piston 97. Current now flows (FIG. 20) through switches $N_1$; LS1 (dotted); LS2 (solid); $P_1$; $Q_1R_1$ (solid); $S_1$; $U_1$; LS3 (dotted); 4CR1; LS5; and D solenoid, energizing the latter. Energizing solenoid D renders unit 175 effective to rotate cam 171 to move lever 60 to its lower position when shaft E1 is rotating at 475 r.p.m. and stage 7 is completed. When lever 60 is at its lower position, escapement 187 causes indexing of shaft 65 to its next position where cam 64 permits rightward movement of valve 69, moving switch LS1 to its solid line position, stopping unit 175 and supplying pressure to line 69'. Pressure liquid in line 69' causes clutch "N" to become engaged, opening contacts $N_1$, and thereafter disengaging clutch "M" and closing contacts $M_1$ under the action of interlock 119, as previously described. Current now flows through switches $M_1$; LS1 (solid); LS2 (solid); $P_1$; $Q_1R_1$ (solid); $S_1$; $U_1$; LS3 (dotted); 4CR1; LS5, and D solenoid, energizing the latter, rendering unit 175 effective to rotate cam 171, moving lever 60 to its upper position. In its upper position, stage 8 has been completed, shaft E1 is rotating at 600 r.p.m., and escapement 187 indexes shaft 65 again, causing cam 62 to permit rightward movement of valve 67, moving switch LS3 to its solid line position, stopping unit 175. Rightward movement of valve 67 also supplies pressure fluid to line 67'. Only piston 86 can move rightwardly since pistons 84 and 85 are prevented by protuberances 122 and 123 (FIG. 14A). Movement of piston 86 leftwardly engages clutch "U," opening contacts $U_1$. This action permits shuttle 121 to lower so that piston 84 can move rightwardly, disengaging clutch "T" and closing contacts $T_1$ (FIG. 14B). Clutch "S" is retained disengaged by protuberance 123 on shuttle 121. Current now flows through switches $M_1$; LS1 (solid); LS2 (solid); $P_1$; $Q_1R_1$ (solid); $T_1$; LS3 (solid); 4CR1; LS5; and D solenoid, energizing the latter, restarting unit 175 to rotate cam 171 to move lever 60 to its lower position. When shaft E1 is rotating at 825 r.p.m., stage 9 is completed and escapement 187 indexes shaft 65 to cause cam 64 to move valve 69 leftwardly, moving switch LS1 to its dotted line position, stopping unit 175. Line 69' is again exhausted, and clutch "M" becomes engaged, opening contacts $M_1$; and thereafter clutch "N" is disengaged, closing contacts $N_1$. Current now flows through switches $N_1$; LS1 (dotted); LS2 (solid); $P_1$; $Q_1R_1$ (solid); $T_1$; LS3 (solid); 4CR1; LS5; and D solenoid, energizing the latter and starting unit 175, causing cam 171 to move lever 60 to its upper position. When shaft E1 is rotating at 1050 r.p.m., stage 10 is completed, and escapement 187 indexes shaft 65 to cause cam 63 to move valve 68 leftwardly, moving switch LS2 to its dotted line position, stopping unit 175 and exhausting line 68'. Exhausting line 68' permits piston 97 to move leftwardly (FIG. 15b), engaging clutch "R," moving switch $Q_1$, $R_1$ to its dotted line position, and disengaging clutch "Q,". This permits shuttle 134 to move down so that piston 98 can move leftwardly (FIG. 15c), engaging clutch "O" and closing contacts $O_1$. Current now flows through switches $N_1$; LS1 (dotted); LS2 (dotted); $X_1$; $O_1$; $Q_1R_1$ (dotted); 4CR1; LS5; and D solenoid, energizing the latter, starting unit 175 which rotates cam 171, moving lever 60 to its lower position where shaft E1 is rotating at 1425 r.p.m. and stage 11 is completed.

When lever 60 is in its lower position, escapement 187 indexes shaft 65, causing cam 64 to permit valve 69 to move to the right, moving switch LS1 to its solid line position and supplying pressure fluid to line 69'. This engages clutch "N," opening switch $N_1$, disengages clutch "M" and closes switch $M_1$. Current now flows through switches M; LS1 (solid); LS2 (dotted); $X_1$; $O_1$; $Q_1R_1$ (dotted); 4CR1; LS5; and D solenoid, energizing the latter, starting unit 175 which rotates cam 171, moving lever 60 to its upper position where shaft E1 is rotating at 1800 r.p.m., the top speed of the transmission.

As previously described, contacts A1 are closed and contacts A2 are open during acceleration. This condition is caused by the unbalance of two potentiometers 213, 214 (FIG. 20). By adjusting potentiometer 213 to any predetermined advancing position that is out of balance with the condition of potentiometer 214 (see also FIG. 19), the contacts A1 are closed and contacts A2 are open; therefore, 4CR relay is energized, maintaining contacts 4CR1 closed. Consequently, unit 175 is cyclically operated, as are cam 171 and shaft 172. Shaft 172 supports a worm 215 that meshes with a worm wheel 216 fixed to a shaft 217 that supports the movable slider for potentiometer 214. When potentiometers 214 and 213 are balanced, the number of cycles of operation of lever 60 will have been effected to produce the preselected speed of shaft E1 as determined by the presetting of potentiometer 213. At this point, a relay is de-energized, opening contacts A–1, de-energizing the 4CR relay, opening contacts 4CR1 and thereby de-energizing solenoid D, stopping unit 175 where it remains until a further movement of potentiometer 213 unbalances it and potentiometer 214.

Cams 218, 219 are provided on shaft 217 and they control LS7 and LS8 switches, respectively. When the transmission is accelerated to its top speed of 1800 r.p.m. of shaft E1, the cam 218 opens LS7 which also acts to de-energize relay 4CR, having the effect of stopping the unit 175.

Referring again to FIGS. 13 and 1, power is adapted to be supplied to the input shaft A1 through a sheave 220 that is fixed to shaft A1, as are hydraulic clutch 221 and brake 222, each of which is operated by an intermediate disk means 223. Referring to FIG. 20 closing contacts 224 energizes relay 2CR which closes contacts 2CR1 and 2CR2. Contacts 2CR1 act as holding contacts, and closing 2CR2 contacts energizes solenoid J which moves valve 225 (FIG. 13) downwardly so that brake 222 is exhausted to tank, and clutch 221 is supplied with pressure fluid. Stopping of the transmission may be effected by pressing push button 226 which, if shaft E1 is rotating within stages 1 to 6, will de-energize 2CR relay, causing contacts 2CR2 to open, thereby de-energizing solenoid J causing valve 225 to raise and supplying pressure fluid to brake 222 while exhausting clutch 221 to tank. Should the shaft E1 be rotating at speeds within satages 7 to 12, and a substantial load is applied to shaft E1, the hydraulic system would be overloaded. Accordingly, means is provided which requires decelerating the transmission to stage 6 before the brake 222 can be applied.

What has been previously described dealt with the acceleration of the transmission. During deceleration, the reverse of what takes place during acceleration occurs, and the reverse cyclic operation of the lever 60 is under the influence of 5CR relay (FIG. 20) and the E solenoid. Thus, pushing the push buttton switch 226 when shaft E1 is rotating within stages 7 to 12 energizes 3CR relay through LS4 switch which is closed during stages 7 to 12. Energizing 3CR relay closes contacts 3CR1 for holding purposes; closes contacts 3CR2 which retains J solenoid energized and hence brake 222 off and clutch 221 energized; and closes 3CR3 contacts, energizing 5CR relay. Energizing 5CR relay closes 5CR1 contacts energizing the E solenoid (FIG. 13) which reverses unit 175 to initiate the reverse cyclic action of lever 60 to effect deceleration of shaft 60. When shaft E1 decelerates to stage 6, LS4 switch opens, causing 3CR relay to de-energize, opening 3CR2 contacts, hence deenergizing solenoid J which applies brake 222 and releases clutch 221.

Furthermore, during deceleration, energizing 5CR relay closes 5CR3 contacts, energizing solenoid C, thereby moving valve 129 downwardly, causing piston 197 to move rightwardly and exhausting the lines 128 and 146 so that during deceleration the interlocks 117 and 118 operate in a reverse manner from the way they operate during acceleration. If the shaft E1 is reduced in speed to zero, a zero speed switch LS8 opens, de-energizing relay 5CR, opening 5CR1 contacts which de-energize solenoid E, stopping unit 175.

Figure 21:
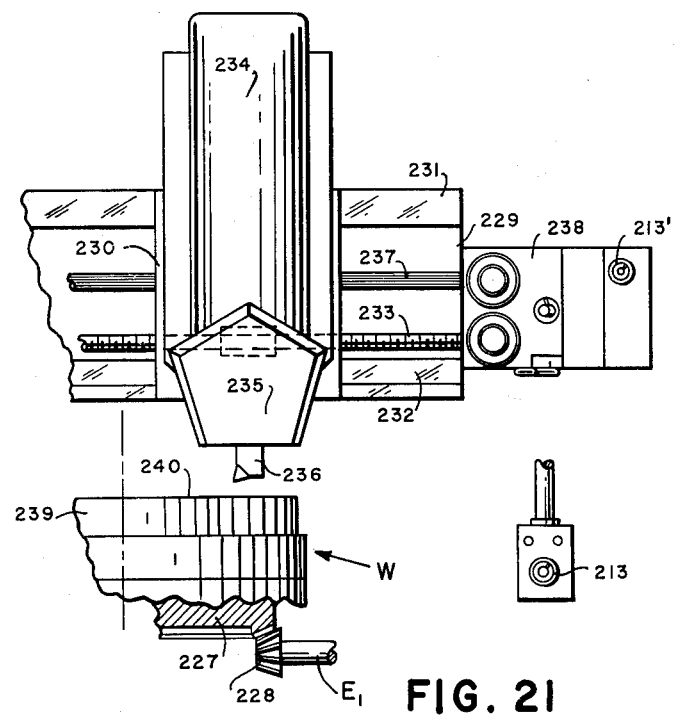
FIG. 21 is a portion of a boring mill to which the transmission of the invention has been applied.

Referring to FIG. 21, the principles of the invention are shown as applied to a machine tool of the vertical turret lathe type. The lathe may include a work supporting table W having a bevel ring gear 227 that meshes with a bevel pinion 228 that is connected to the output shaft E1 of the transmission. A cross rail 229 may support a saddle 230 for reciprocative motion along ways 231, 232 of the cross rail 229 by the rotation of a screw 233. The saddle 230 may support a slide 234 having a turret 235 mounted thereon to which may be fixed a metal cuttting tool 236. The slide 234 may be reciporacated along ways in the saddle 230 by the rotation of a splined shaft 237, all as is well known in the machine tool art.

The screw 233 and splined shaft 237 may be rotated in both directions by a feedworks 238 which may receive its power from the transmission containing the E1 shaft. A work piece 239 may be chucked to the table W, and the top surface 240 thereof may be desired to be faced by the tool 236. Since there is an optimum cutting speed for the removal of metal, as the tool 236 approaches the center of the table W, the speed of rotation of table W should progressively increase. For best results, this increase should be stepless and can be achieved with the transmission of the present invention.

Referring to FIGS. 21, 22 and 23, the screw 233 may be connected to a shaft 241 to which a gear 242 is keyed. Gear 242 meshes with a gear 234 that in turn meshes with a gear 244 having a disk 245 integrally fixed thereto. A cam 246 is mounted on disk 245 for angular adjustment and adapted to be locked thereto by bolts 247 cooperating with an overlapping ring 248.

The cam 246 supports a cam follower 249 that is journaled at the end of one arm of a bell crank 250 that is pivotally mounted on a stationary pin 251. Another lever 252 is pivoted on pin 251, and it is resiliently urged in a clockwise direction by a spring 253. A pin 254 on the bell crank 250 is resiliently urged against an abutment 255 on the lever 252 by a spring 256 connected at its one end to lever 252 and at its other end to the end of the arm of bell crank 250 opposite that supporting follower 249. The construction and arrangement are such that the bell crank 250 can be moved counterclockwise about pivot pin 251 by cam 246 after lever 252 is stopped by a positive stop for a purpose to be described later.

The upper end of lever 252 may include an elongated recess 258 into which may extend a gear 259 that is connected to a sleeve 260 journaled in a bracket 261. A shaft 262 is journaled interiorly of sleeve 260 and it includes a disk 263 at one end thereof. The end of shaft 262 including disk 263 is counterbored to receive the shaft 264 that supports the brush means of a potentiometer 213'. A set screw 265 adjustably connects shaft 262 to shaft 264. A pin 266 on the periphery of disk 263 is adapted to engage an abutment 267 for a purpose to be described later.

A disk 268 is adapted adjustably to be connected to the sleeve 260 by a set screw 269, and a hub 270 supporting a pointer is adapted to be adjustably connected to sleeve 260 by a set screw 271 and to shaft 262 by a set screw 272; and a disk 273 containing indices of table r.p.m. is fixed to bracket 261, all for a purpose to be described.

The gear 244, disk 245 and cam 246 are journaled on a shaft 274 mounted in bracket 261. The cam 246 includes indices representing inches from the center of rotation of table W, in both a left and a righthand direction.

The periphery of cam 246 is made up of two identical curves 275 and 276 starting from zero and ending with 50 inches from the center of table W. These curves are developed from data including the dimensions of the lever 252 and the amount of effective rotation of the potentiometer 213'. The curves are constructed so that the movement of rack 259' throughout its stroke rotates gear 259 such that the brushes of the potentiometer 213' move from the lowest to the highest effective value of resistance thereof.

The cam 246 is common for all sizes of machines, but require a predetermined setup arrangement for a given size machine. For purposes of calculation, 1,000 feet per minute is used as a standard for all machines, and this is the highest reading on dial 268. Knowing the maximum speed of the table W for any machine permits solving for a value of a diameter the periphery of which will be traveling at 1,000 feet per minute.

The tool 236 is then set so that its cutting edge is at one-half this calculated diameter from the center of table W. The screws 247 are loosened and cam 246 is rotated so that a pointer 277 is adjacent a value equal to half the calculated diameter and on the same side of the center of table W as is the tool 236.

With set screws 271, 272, 269 and 265 loosened and the potentiometer disassembled from its support, the shaft 262 is rotated until pin 266 on disk 264 abuts stop 267. The brushes of the potentiometer are moved to their one extremity representing full speed, the potentiometer is assembled to its support, and set screw 265 is locked.

A pointer 278 is then set to a value of r.p.m. equal to the maximum speed of table W for the given machine, and set screws 271 and 272 are locked. The disk 268 is then rotated until 1,000 feet per minute is opposite pointer 278, whereupon set screw 269 is locked.

The above procedure merely correlates the various parts of the system so that they remain in phase relation. Any desired cutting speed in feet per minute may be obtained by locating tool 236 at the position from the center of table W as previously explained, loosening set screw 271, and rotating shaft 262 and pointer 278 to the desired value, say 200 ft./min. This rotates the potentiometer brushes independently of the position of the rack 259' and gear 259. Consequently, the apparatus is now set for 200 feet per minute instead of 1,000.

It becomes apparent that for certain values of cutting speed, the apparatus can produce it only within its own limitations. Thus, it is obvious that below a certain diameter, a high enough r.p.m. of the table W cannot be obtained to maintain 1,000 feet per minute. When operating in this range, the bell crank 250 continues to pivot about pin 251 while lever 252 remains at its maximum position. This is made possible by the pin 254 and abutment construction 255.

Referring to FIG. 20, when the constant cutting speed control of FIG. 22 is employed, potentiometer 213 is removed from the circuit and potentiometer 213' is inserted. Potentiometer 213', changing with the movement of tool 236, continuously unbalances the relation between it and potentiometer 214 driven by shaft 172 (FIG. 19). Accordingly, the speed of the table continuously changes as the two potentiometers 213 and 213' continuously move to maintain a balanced condition between them.

Although the various features of the variable speed transmission and control have been described in detail to fully disclose one embodiment of the invention, it will be evident that changes may be made in such details and certain features may be used without others without departing from the principles of the invention.

What is claimed is:

1. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and one of said shafts for effecting the operation of said two arrangements; and auxiliary variable speed means connected to said other epicyclic gearing means for controlling the operation of said other epicyclic gearing means.

2. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of the epicyclic gearing arrangements being such that the output speed at the low point of the range of the other arrangement coincides with the output speed at the high point of the range of speeds of said first mentioned arrangement; other epicyclic gearing means connected between the two arrangements and one of said shafts for effecting the operation of said two arrangements; and auxiliary, steplessly variable speed means connected to said other epicyclic gearing means for controlling the operation of said other epicyclic gearing means.

3. In a transmission, two spaced shafts; plural paths of power flow connecting said shafts; an epicyclic gearing arrangement in each path of power flow; selectively operable clutch means connected to one of said arrangements to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and one of said shafts for effecting the operation of said two arrangements; and auxiliary variable speed means connected to said other epicyclic gearing means for controlling the operation of said other epicyclic gearing means.

4. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangement being such that the output speed at the low point of said second range of speeds coincides with the output speed at the high point of the range of speeds of said other arrangement; other epicyclic gearing means connected between the two arrangements and one of said shafts for effecting the operation of said two arrangements; and auxiliary, steplessly variable speed means connected to said other epicyclic gearing means for controlling the operation of said other epicyclic gearing means.

5. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and one of said shafts for effecting the operation of said two arrangements; reversing gearing means between said epicyclic gearing arrangements and said other epicyclic gearing means; and auxiliary variable speed means connected to said other epicyclic gearing means for controlling the operation of said other epicyclic gearing means.

6. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and one of said shafts for effecting the operation of said two arrangements; reversing gearing means between said epicyclic gearing arrangements and said other epicyclic gearing means; and auxiliary, hydraulic, steplessly variable speed means connected to said other epicyclic gearing means for controlling the operation of said other epicyclic gearing means.

7. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; a pair of other epicyclic gearing means connected between the two arrangements and one of said shafts for effecting the operation of said two arrangements; reversing gearing means between said epicyclic gearing arrangements and said other pair of epicyclic gearing means; and auxiliary variable speed means connected to said other epicyclic gearing means for controlling the operation of said other epicyclic gearing means.

8. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and one of said shafts for effecting the operation of said two arrangements; reversing gearing means between said epicyclic gearing arrangements and said other epicyclic gearing means; and auxiliary variable speed means connected to said other epicyclic gearing means for controlling the operation of said other epicyclic gearing means.

9. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangement being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and one of said shafts for effecting the operation of said two arrangements; reversing gearing means between said epicyclic gearing arrangements and said other epicyclic gearing means; and auxiliary, hydraulic, steplessly variable speed means connected to said other epicyclic gearing means for controlling the operation of said other epicycle gearing means.

10. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; a pair of other epicyclic gearing means connected between the two arrangements and one of said shafts for effecting the operation of said two arrangements; reversing gearing means between said epicyclic gearing arrangements and said other pair of epicyclic gearing means; and auxiliary variable speed means connected to said other epicyclic gearing means for controlling the operation of said other epicyclic gearing means.

11. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; and clutch means for selectively connecting said elements of said separate epicyclic gearing means to an element of said epicyclic gearing arrangements when said elements of said separate epicyclic gearing means, respectively, are above and below the base speed of their corresponding epicyclic gearing means.

12. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary, steplessly variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; and clutch means for selectively connecting said elements of said separate epicyclic gearing means to an element of said epicyclic gearing arrangements when said elements of said separate epicyclic gearing means, respectively, are above and below the base speed of their corresponding epicyclic gearing means.

13. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary, hydraulic, steplessly variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; and clutch means for selectively connecting said elements of said separate epicyclic gearing means to an element of said epicyclic gearing arrangements when said elements of said separate epicyclic gearing means, respectively, are above and below the base speed of their corresponding epicyclic gearing means.

14. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means having a variable capacity positive displacement hydraulic unit and a constant displacement hydraulic unit within a closed hydraulic circuit and connected to an element of each of said separate epicyclic gearing means for causing said elements simultaneously to increase and decrease in speed relative to the base speed of its corresponding separate epicyclic gearing means when the speed of said auxiliary variable speed means is changed; and clutch means for selectively connecting said elements of said separate epicyclic gearing means to an element of said epicyclic gearing arrangements when said elements of said separate epicyclic gearing means, respectively, are above and below the base speed of their corresponding epicyclic gearing means.

15. In a variable speed transmission, an input shaft; output shaft; plural paths of power flow connecting said input and output shaft; an epicyclic gearing arrangement in each of said paths of power flow; separate epicyclic gearing means connecting each arrangement to said input shaft; auxiliary variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; clutch means for selectively connecting said elements of said separate epicyclic gearing means to an element of said epicyclic gearing arrangements when said elements of said separate epicyclic gearing means, respectively, are above and below the base speed of their corresponding epicyclic gearing means; and means for selectively connecting an element of said epicyclic gearing arrangements to said output shaft.

16. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary, steplessly variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; clutch means for selectively connecting said elements of said separate epicyclic gearing means to an element of said epicyclic gearing arrangements when said elements of said separate epicyclic gearing means, respectively, are above and below the base speed of their corresponding epicyclic gearing means; and means for selectively connecting an element of said epicyclic gearing arrangements to said output shaft.

17. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means having a variable capacity positive displacement hydraulic unit and a constant displacement hydraulic unit within a closed hydraulic circuit and connected to an element of each of said separate epicyclic gearing means for causing said elements simultaneously to increase and decrease in speed relative to the base speed of its corresponding separate epicyclic gearing means when the speed of said auxiliary variable speed means is changed; clutch means for selectively connecting said elements of said separate epicyclic gearing means to an element of said epicyclic gearing arrangements when said elements of said separate epicyclic gearing means, respectively, are above and below the base speed of their corresponding epicyclic gearing means; and means for selectively connecting an element of said epicyclic gearing arrangements to said output shaft.

18. In a variable speed transmission, a variable displacement unit; a constant displacement unit connected to said variable displacement unit in a closed hydraulic circuit; means for varying the displacement of said variable displacement unit to cause said constant displacement unit to vary in speed; cooperating means, respectively, driven by said constant displacement unit and the input to said variable displacement unit; and means responsive to variations in the speed of said cooperating means for varying the displacement of said variable displacement unit to compensate for said variations in speed of said cooperating means.

19. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and one of said shafts for effecting the operation of said two arrangements; an auxiliary variable displacement unit driven from the input of said transmission; a constant displacement unit in a closed hydraulic circuit with said auxiliary variable displacement unit and connected to said other epicyclic gearing means; means for varying the displacement of said variable displacement unit to cause said constant displacement unit to vary in speed; cooperating means, respectively, driven by said constant displacement unit and the input to said variable displacement unit; and means responsive to variations in the speed of said cooperating means for varying the displacement of said variable displacement unit to compensate for said variations in speed of said cooperating means.

20. In a transmission, two spaced shafts; plural paths of power flow connecting said shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and one of said shafts for effecting the operation of said two arrangements; an auxiliary variable displacement unit driven from the input of said transmission; a constant displacement unit in a closed hydraulic circuit with said auxiliary variable displacement unit and connected to said other epicyclic gearing means; means for varying the displacement of said variable displacement unit to cause said constant displacement unit to vary in speed; cooperating means, respectively, driven by said constant displacement unit and the input to said variable displacement unit; and means responsive to variations in the speed of said cooperating means for varying the displacement of said variable displacement unit to compensate for said variations in speed of said cooperating means.

21. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; separate clutch means for selectively connecting said elements of said separate epicyclic gearing means to an element of said epicyclic gearing arrangements, when said elements of said separate epicyclic gearing means, respectively, are above and below the base speed of their corresponding epicyclic gearing means; and interlocking means for preventing the disengagement of one of said clutches until after the other has been engaged.

22. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means connected to an element of each of separate epicyclic gearing means for causing said elements simultaneously to increase and decrease in speed relative to the base speed of its corresponding separate epicyclic gearing means when the speed of said auxiliary variable speed means is changed; separate clutch means for selectively connecting said elements of said separate epicyclic gearing means to an element of said epicyclic gearing arrangements, when said elements of said separate epicyclic gearing means, respectively, are above and below the base speed of their corresponding epicyclic gearing means; and interlocking means for preventing the disengagement of one of said clutches until after the other has been engaged, said interlocking means comprising a shuttle member having protuberances adapted to cooperate with passage means associated with said clutch means.

23. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and said input shaft for effecting the operation of said two arrangements; auxiliary variable speed means connected to said other epicyclic gearing means for controlling the operation of said other epicyclic gearing means; three separate clutches for connecting an element of said epicyclic gearing arrangements to said output shaft during the three separate speed ranges produced by said arrangements; and interlocking means for preventing the disengagement of an engaged clutch until another of said separate clutches is engaged.

24. In a transmission, an input shaft; an output shaft; plural paths of power flow connecting between said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; change speed means connected to at least said first mentioned arrangement to produce a second output range of speeds therein from a point below to a point above its base speed, the design of said epicyclic gearing arrangements being such that the output speed at the low point of said second range of speeds coincides with the output speed at the high point of the range of speeds of said other arrangement; other epicyclic gearing means connected between the two arrangements and said input shaft for effecting the operation of said two arrangements; auxiliary variable speed means connected to the other epicyclic gearing means for controlling the operation of said other epicyclic gearing means; three separate clutches for connecting an element of said epicyclic gearing arrangements to said output shaft during the three separate speed ranges produced by said arrangements; and interlocking means for preventing the disengagement of an engaged clutch until another of said separate clutches is engaged, said interlocking means comprising a shuttle adapted to be moved in a step-by-step manner and including protuberances adapted to cooperate with passage means associated with said clutches.

25. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary variable speed means connected to said other epicyclic gearing means for controlling the operation of said other epicyclic gearing means; separate clutches for connecting an element of said other epicyclic gearing means to an element of the epicyclic gearing arrangements; separate other clutches for connecting said reversing gearing means to an element of the epicyclic gearing arrangements; and interlocking means for preventing the disengagement of an engaged clutch of a group until after another of said clutches of said group is engaged.

26. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary variable speed means connected to said other epicyclic gearing means for controlling the operation of said other epicyclic gearing means; separate clutches for connecting an element of said other epicyclic gearing means to an element of the epicyclic gearing arrangements; separate other clutches for connecting said reversing gearing means to an element of the epicyclic gearing arrangements; and interlocking means for preventing the disengagement of an engaged clutch of a group until after another of said clutches of said group is engaged, said interlocking means comprising a shuttle adapted to be moved in a step-by-step manner and including protuberances adapted to cooperate with passage means associated with said clutches.

27. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; separate clutches for connecting an element of said other epicyclic gearing means to an element of the epicyclic gearing arrangements; separate other clutches for connecting said reversing gearing means to an element of the epicyclic gearing arrangements; and interlocking means for preventing the disengagement of an engaged clutch of a group until after another of said clutches of said group is engaged.

28. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; separate clutches for connecting an element of said other epicyclic gearing means to an element of the epicyclic gearing arrangements; separate other clutches for connecting said reversing gearing means to an element of the epicyclic gearing arrangements; and interlocking means for preventing the disengagement of an engaged clutch of a group until after another of said clutches of said group is engaged, said interlocking means comprising a shuttle adapted to be moved in a step-by-step manner and including protuberances adapted to cooperate with passage means associated with said clutches.

29. In a variable speed transmission, an input shaft; an output shaft; plural paths of power flow connecting said input and output shafts; an epicyclic gearing arrangement in each of said paths of power flow; separate epicyclic gearing means connecting each arrangement to said input shaft; auxiliary variable speed means connected to an element of each of said separate epicyclic gearing means for causing said elements simultaneously to increase and decrease in speed relative to the base speed of its corresponding separate epicyclic gearing means when the speed of said auxiliary variable speed means is changed; separate clutch means for selectively connecting said elements of said separate epicyclic gearing means to an element of said epicyclic gearing arrangements, when said elements of said separate epicyclic gearing means, respectively, are above and below the base speed of their corresponding epicyclic gearing means; other clutch means for selectively connecting an element of each of said epicyclic gearing arrangements to said output shaft when said last mentioned elements are, respectively, above and below the base speed of their corresponding arrangements; and separate interlocking means for said separate clutch means and said other clutch means for preventing the disengagement of a clutch of each group until after another clutch of the corresponding group has been engaged.

30. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; first and second groups of clutches for selectively connecting an element of said other epicyclic gearing means to an element of said epicyclic gearing arrangements; a third group of clutches adapted to be employed instead of said second group for selectively connecting the element of said other epicyclic gearing means to an element of said epicyclic gearing arrangements through said reversing gearing; a fourth group of clutches for connecting an element of said epicyclic gearing arrangements to said output shaft; and separate interlocking means for each group of clutches for preventing the disengagement of any clutch within a group until after the engagement of another clutch within the corresponding group.

31. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; first and second groups of clutches for selectively connecting an element of said other epicyclic gearing means to an element of said epicyclic gearing arrangements; a third group of clutches adapted to be employed instead of said second group for selectively connecting the element of said other epicyclic gearing means to an element of said epicyclic gearing arrangements through said reversing gearing; a fourth group of clutches for connecting an element of said epicyclic gearing arrangements to said output shaft; and separate interlocking means for each group of clutches for preventing the disengagement of any clutch within a group until after the engagement of another clutch within the corresponding group, said interlocking means comprising separate shuttle means for each group of clutches having protuberances adapted to cooperate with passage means associated with the various clutches of the corresponding group of clutches.

32. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; first and second groups of clutches for selectively connecting an element of said other epicyclic gearing means to an element of said epicyclic gearing arrangements; a third group of clutches adapted to be employed instead of said second group for selectively connecting the element of said other epicyclic gearing means to an element of said epicyclic gearing arrangements through said reversing gearing; a fourth group of clutches connecting a element of said epicyclic gearing arrangements to said output shaft; means for cyclically varying said auxiliary variable speed means; and means for interrupting said cyclic variation at the beginning and midpoint of each cycle until predetermined of said clutches have been engaged and disengaged.

33. In a transmission, an input shaft; an output shaft; plural paths of power flow connecting said input and output shafts; an epicyclic gearing arrangement in each path of power flow; selectively operable clutch means connected to one of said arrangements for causing it to produce an output speed range from a point below its base speed to a point above its base speed while the other arrangement is ineffective; other selectively operable clutch means connected to the other of said arrangements for causing it to produce an output range of speeds from a point below its base speed to a point above its base speed while the first mentioned arrangement is ineffective, the design of said epicyclic gearing arrangements being such that the output speed at the low point of the range of the other arrangement coincides with the output speed at the high point of the range of speeds of said first mentioned arrangement; other epicyclic gearing means connected between the two arrangements and said input shaft for effecting the operation of said two arrangements; reversing gearing means between said epicyclic gearing arrangements and said other epicyclic gearing means; auxiliary, hydraulic, steplessly variable speed means connected to said other epicyclic gearing means for controlling the operation of said other epicyclic gearing means; first and second groups of clutches for selectively connecting an element of said other epicyclic gearing means to an element of said epicyclic gearing arrangements; a third group of clutches adapted to be employed instead of said second group for selectively connecting the element of said other epicyclic gearing means to an element of said epicyclic gearing arrangements through said reversing gearing; a fourth group of clutches for connecting an element of said epicyclic gearing arrangements to said output shaft; separate interlocking means for each group of clutches for preventing the disengagement of any clutch within a group until after the engagement of another clutch within the corresponding group; means for cyclically varying said auxiliary variable speed means; and means for interrupting said cyclic variation at the beginning and midpoint of each cycle until predetermined of said clutches have been engaged and disengaged.

References Cited by the Examiner

UNITED STATES PATENTS

| | | | |
|---|---|---|---|
| 1,747,349 | 2/30 | Crain | 60—52 X |
| 2,808,737 | 10/57 | Bullard | 74—687 |
| 2,809,333 | 10/57 | Wagner | 318—39 |
| 2,833,160 | 5/58 | Morgan | 74—681 |
| 2,972,905 | 2/61 | Bullard | 74—681 |
| 3,008,071 | 11/61 | Karger | 318—11 |
| 3,075,418 | 1/63 | Mobius | 82—2 |
| 3,090,266 | 5/63 | Wagner | 82—2 |

DON A. WAITE, *Primary Examiner.*

WILLIAM W. DYER, JR., RICHARD H. EANES, JR.,
*Examiners.*

UNITED STATES PATENT OFFICE
CERTIFICATE OF CORRECTION

Patent No. 3,203,276                        August 31, 1965

Edward P. Bullard III

It is hereby certified that error appears in the above numbered patent requiring correction and that the said Letters Patent should read as corrected below.

Column 8, line 15, beginning with "Aso=" strike out all to and including "sun gear were released.", in line 27, same column 8, and insert instead the following:

$$Abs = \frac{20}{60 + 20}(2100) = 525 \text{ r.p.m. of SA2 when lever 60 is central.}$$

$$Asd = \frac{60}{60 + 20}(500) = \frac{3}{4} \times 500 = 375 \text{ r.p.m. of SA2 with sun}$$

fixed but reactor rotating in same direction as sun gear 34 if sun gear were released.

$$Aso = \frac{60}{60 + 20}(300) = \frac{3}{4} \times 300 = 225 \text{ r.p.m. of SA2 with sun}$$

gear fixed but reactor rotating oppositely to sun gear 34 if sun gear were released.

column 10, in the SUMMARY tabulation, first column, line 3 thereof, for "602 (max.)" read -- 600 (max.) --; column 11, following the caption SHAFT HORSEPOWER, for "H.P.=T×R.P.M." read -- $H.P. = \frac{T \times R.P.M.}{63,000}$ --; column 21, line 68, for "LD3" read -- SD3 --; column 24, line 2, for "The" read -- the --; line 70, for "Rso" read -- Dso --; column 33, in the SHAFT TORQUE tabulation, heading to the fifth column, for "TD2" read -- TB1 --; same column 33, in the first formula under the SHAFT TORQUE tabulation, for "(columb 11)" read -- (column 11) --; column 38, line 10, for "extends" read -- tends --; column 40, line 75, for "satages" read -- stages --; column 41, line 61, for "234" read -- 243 --; column 42, line 39, for "require" read -- requires --; column 46, lines 53 to 55, strike out "change speed means connected to at least said first mentioned arrangement;"; column 50, line 7, before "seperate" insert -- said --; line 59, strike out "between".

Signed and sealed this 7th day of February 1967.

(SEAL)
Attest:

ERNEST W. SWIDER
Attesting Officer

EDWARD J. BRENNER
Commissioner of Patents